United States Patent [19]

Knecht et al.

[11] Patent Number: 4,650,042

[45] Date of Patent: Mar. 17, 1987

[54] HYDRAULIC ADJUSTABLE SHOCK ABSORBER

[75] Inventors: Heinz Knecht, Eitorf; Alfred Preukschat, Königswinter; Hubert Beck, Eitorf-Keuenhof, all of Fed. Rep. of Germany

[73] Assignee: Boge GmbH, Eitorf, Fed. Rep. of Germany

[21] Appl. No.: 778,606

[22] Filed: Sep. 20, 1985

Related U.S. Application Data

[63] Continuation-in-part of Ser. No. 772,316, Sep. 4, 1985, Ser. No. 735,452, May 17, 1985, and Ser. No. 700,451, Feb. 11, 1985, said Ser. No. 772,316, is a continuation-in-part of Ser. No. 766,871, Aug. 16, 1985, which is a continuation-in-part of Ser. No. 653,930, Sep. 24, 1984, Pat. No. 4,587,850, which is a continuation-in-part of Ser. No. 621,075, Jun. 15, 1984, Pat. No. 4,577,509.

[30] Foreign Application Priority Data

Sep. 22, 1984 [DE] Fed. Rep. of Germany ....... 3434877

[51] Int. Cl.⁴ .......................... F16F 9/46; B60G 17/06
[52] U.S. Cl. ..................................... 188/299; 188/313; 280/707; 137/339
[58] Field of Search ............... 188/299, 319, 285, 300, 188/303, 309, 310, 322.13–322.15, 313–315, 1.11; 280/707; 137/614.20, 614.21, 599, 339; 251/129.15, 129.08

[56] References Cited

U.S. PATENT DOCUMENTS

| | | | |
|---|---|---|---|
| 2,011,460 | 8/1935 | Snyder | 188/285 |
| 2,070,709 | 2/1937 | Carter | 188/299 |
| 2,346,275 | 4/1944 | Read et al. | 188/315 |
| 2,672,952 | 3/1954 | Smith | 188/313 |
| 2,838,140 | 6/1958 | Rasmusson et al. | 188/313 |
| 3,107,753 | 10/1963 | Georgette | 188/313 |
| 3,125,186 | 3/1964 | Day | 188/303 X |
| 3,381,701 | 5/1968 | Sherwood et al. | 137/339 |
| 3,410,301 | 11/1968 | Merriner et al. | 137/339 X |
| 4,065,154 | 12/1977 | Glaze | 280/707 |
| 4,386,626 | 6/1983 | Hehl | 251/129.08 X |

FOREIGN PATENT DOCUMENTS

| | | |
|---|---|---|
| 1405781 | 6/1970 | Fed. Rep. of Germany . |
| 2119531 | 11/1971 | Fed. Rep. of Germany . |
| 2738455 | 3/1979 | Fed. Rep. of Germany . |
| 2655705 | 6/1980 | Fed. Rep. of Germany . |
| 2744301 | 6/1982 | Fed. Rep. of Germany . |
| 3312881 | 11/1984 | Fed. Rep. of Germany ...... 188/299 |
| 1175293 | 3/1959 | France .................... 188/299 |
| 7437503 | 6/1976 | France .................... 188/299 |
| 85707 | 5/1983 | Japan ..................... 188/299 |

*Primary Examiner*—Douglas C. Butler
*Assistant Examiner*—Matthew C. Graham
*Attorney, Agent, or Firm*—Nils H. Ljungman

[57] ABSTRACT

A vibration damping system for vehicles, with a damping element in a cylinder. The cylinder holds a damping medium and is divided into two chambers by a piston. A damping valve, located in a bypass, is connected parallel to the work cylinder. The damping valve variably controls damping to any desired damping in the decompression and compression stages of operation of the vibration damping system. The damping valve has an axially-movable, controllable valve being disposable in an opening. The controllable valve is connected in a series fluid flow relationship with at least one pressure-controlled, spring-loaded valve within the same valve body. The damping valve can be installed in numerous variations in vibration damping systems of vehicles.

21 Claims, 59 Drawing Figures

HYDRAULIC ADJUSTABLE SHOCK ABSORBER

CROSS REFERENCE TO CO-PENDING APPLICATIONS

This application is a continuation-in-part of co-pending application Ser. No. 772,316, for filing by Bernd Moser and Heinz Knecht on Sept. 4, 1985, entitled "Hydraulic Vibration Damper Having Adjustable Damping Valve", which application is a continuation-in-part of co-pending application Ser. No. 766,871, filed by Bernd Moser on Aug. 16, 1985, entitled "Apparatus For The Determination Of The Distance Traveled By A Piston In A Cylinder", which application is a continuation-in-part of co-pending application Ser. No. 653,930 filed by Bernd Moser on Sept. 24, 1984, now U.S. Pat. No. 4,587,850, entitled "Arrangement For Determining The Travel Of A Piston", which application is a continuation-in-part of co-pending application Ser. No. 621,075, filed by Bernd Moser on June 15, 1984, now U.S. Pat. No. 4,577,509, entitled "Arrangement For Determining The Travel Of A Piston"; further co-pending application Ser. No. 700,451, filed by Heinz Knecht, Hubert Beck, and Alfred Preukschat on Feb. 11, 1985, entitled "Vibration Damper Apparatus"; and still further co-pending application Ser. No. 735,452, filed by Hubert Beck on May 17, 1985, entitled "Adjustable Hydraulic Shock Absorber", all of the above-cited co-pending applications being assigned to the same assignee as the instant application.

BACKGROUND OF THE INVENTION

1. Field of the Invention

The invention relates to a hydraulic adjustable shock absorber with a work piston fastened to a piston rod, which divides the work cylinder into two work chambers filled with damping fluid, whereby there is a bypass valve parallel to the work cylinder.

2. Description of the Prior Art

Hydraulic telescoping vibration dampers are known, such as the types described in German Pat. No. 26 55 705 and German Pat. No. 27 44 301, in which a work chamber is divided into two partial chambers by a piston, whereby the damping piston exhibits the necessary mechanical valves for the production of damping force. Such a conventional vibration damper, however, has the disadvantage that the corresponding damping characteristic is fixed depending on the type of vehicle, and thereby must achieve a compromise between various vehicle conditions. Such a vibration damping of the vehicle with telescoping vibration dampers is correspondingly severely limited by the restricting parameters during operation, whereby different load conditions also have an effect on the system.

A process for active vibration damping is also known, as in German Laid Open Patent Application No. DE-OS 27 38 455, in which the damping force can be adjusted. A disadvantage here, however, is the fact that the damping losses must be replaced by means of an external pump. Such a system, with the addition of outside energy, requires an additional, externally-fed hydraulic system, and is therefore very expensive. Not all types of vehicles have, or will even accommodate, such an additional hydraulic system. Moreover, since the entire hydraulic system would fail if this external pump would fail, the vehicle may not be safe.

Electrically remote-controlled shock absorbers are also known, as described in German Patent Publication Published For Opposition Purposes No. DE-AS No. 14 05 781, in which the damping characteristic can be adjusted by means of a lifting magnet apparatus. Thus, the valve body modifies the cross section of a throttle. With such throttles in a bypass, throttle characteristics can be adjusted only gradually, so that as a result of the progressivity, parallel to the normal damping valves in damping pistons, a severely-restricted force-velocity curve variation of the vibration damper is achieved. In actual practice, it has been shown that such throttles are poorly suited to the satisfactory fulfillment of requirements for the variability of the damping force characteristics.

OBJECT OF THE INVENTION

The object of the invention, therefore, is to configure a vehicle damping system with a variable damping adjustment, so that by means of a variably-controllable damping valve, a suitably adjustable damping of the decompression and compression stage can be achieved.

SUMMARY OF THE INVENTION

The present invention achieves this objective, in that the damping valve, located in a bypass, comprises an axially movable, controllable valve which works together with an opening. The controllable valve is connected in a series fluid flow relationship with at least one pressure-controlled spring-loaded valve within the same valve body.

This arrangement is advantageous in that the damping valve can be installed in the vibration damping system of a vehicle in several variations. It is thereby possible to locate the damping valve parallel to the conventional throttle valves in the damping piston and/or in the cylinder bottom, or check valves can be installed in the damping piston and in the cylinder bottom, so that the damping valve is installed in a bypass. With the use of blockable vibration dampers, it is possible to install the damping valve without further valves in the damping piston and in the bottom region. Moreover, it is advantageous if, as a result of the series connection of the spring-loaded valve, a pressure-dependency is achieved and the cross section of the opening, together with the axially movable controllable valve body, can exhibit a cross section which is so large that hardly any throttling of the damping medium occurs. In this manner, in connection with the spring-loaded valve, damping characteristics can be achieved which provide the required high degree of flexibility when connected annularly to any conventional damping valves, connected in parallel, which may be present in the work piston and/or in the cylinder bottom.

One essential characteristic is that, in the decompression and compression stage, the flow travels past the damping valve in one direction, with the spring-loaded valve being located in the flow direction ahead of the valve body. In this two-tube damping system, having only one damping valve in a bypass for a decompression and compression stage, an adaptation to the desired or required characteristics can be achieved by a suitable choice of decompression stage displacement surface to the compression stage displacement surface.

When the damping valve is installed in a one-tube damping system, another characteristic of the invention is that, in the decompression and compression stage, the flow travels past the damping valve from different directions, and that there is at least one pressure-controlled spring-loaded valve for the decompression and compression stage.

In another embodiment of the invention, the damping valve exhibits at least two pressure-controlled spring-loaded valves when there are different flow directions in the decompression and compression stage. These spring-loaded valves carry the flow successively in the compression stage, with one of the valves being activated in the decompression stage.

A simple and economical control of the valve is achieved by controlling the axially-movable valve body by means of an electromagnet. It is particularly favorable if the electromagnet is surrounded by the damping medium. An important characteristic is that the armature of the electromagnet is designed as a valve body.

According to an essential characteristic, the axially-movable valve body is controlled by means of an external application of pressure. The advantage here is that the damping valve can be controlled either electrically, hydraulically or pneumatically, so that an adaptation to the current road and vehicle conditions is possible. An important characteristic of the invention when used with conventional damping valves working in parallel, is that the valve body is activated by a spring, whereby the valve body closes the opening when in the rest position, thus assuring the safety of the vehicle in the event of a failure of the control of the damping valve in the bypass.

Further flexibility of the damping characteristics is achieved if the configuration of the invention provides that the opening and the valve body exhibit a cross section corresponding to a throttle.

In a preferred embodiment of the invention, the spring-loaded valve is designed as a spring washer valve, or comprises at least one spring washer and at least one coil spring. In addition, the spring-loaded valve may comprise a washer and at least one coil spring.

In one embodiment of the invention, the spring-loaded valve can exhibit a continuously open, constant throttle cross section, which influences the damping force in the lower piston velocity range.

In another advantageous configuration of the invention, the spring-loaded valve exhibits a stop which is used to limit the stroke, or the spring-loaded valve exhibits a second valve seat which closes the flow connection when a defined axial stroke is exceeded.

To achieve a pre-throttle cross section, there is at least one inflow hole, whereby some of the cross sections of all inflow holes has a total cross section corresponding to a throttle arrangement in the valve.

According to another essential characteristic, when there are several damping valves, the damping valves are connected in parallel. Thereby, the same bypass channel can be used to carry the flow to the valves.

In addition, when there are several damping valves, at least one valve can be active in the compression stage, and at least one other valve can be active in the decompression stage. The valve is controlled by means of a suitable electronic system, whereby an appropriate number of sensors are also provided. An adaptation of the damping characteristic can be undertaken by means of the corresponding sensors after the determination of the instantaneous parameters. The load and travel conditions of the vehicle, as well as the speed of travel, can be taken into consideration. It is also possible to achieve a configuration of the vibration damping system in which the data from the front axle can be used as signals for the rear axle. Moreover, a multi-parameter regulation system can also be created by a corresponding number of sensors.

BRIEF DESCRIPTION OF THE DRAWINGS

Preferred embodiments of the invention are diagrammatically and schematically illustrated in the accompanying drawings, wherein.

DESCRIPTION OF THE PREFERRED EMBODIMENTS

Figure 1:
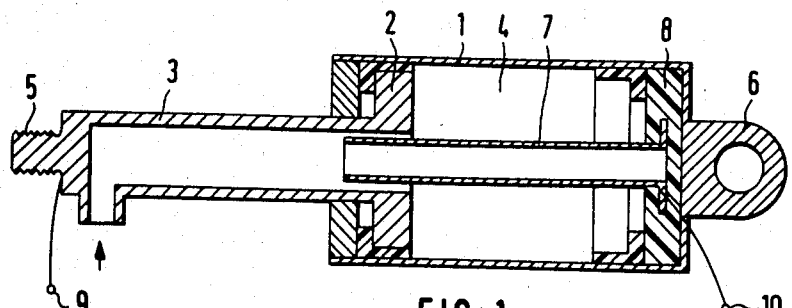
FIG. 1 shows a sectional view of a vibration damper, in which the hollow piston rod forms a variable capacitor in conjunction with a tube in a cavity of the damper.

The vibration damper illustrated in FIG. 1 comprises substantially a cylinder 1, a piston 2 and a piston rod 3, well known in the prior art. In the interior cavity 4 of the cylinder 1 there is at least one damping medium serving for damping vibrations of the piston 2. Attachment means 5 and 6, well-known in the prior art, are provided for mounting the vibration damper in a vehicle. The piston rod 3, which is made hollow, slides telescopically over a tube 7, the tube 7 being located in the cylinder 1, and attached thereto by an insulating body 8 which insulates the tube 7 from the remainder of the components of the damper. The hollow piston rod 3 and the tube 7 form together a variable circular cylindrical capacitor. The damping medium present in the interior cavity 4 forms a dielectric for the capacitor. The hollow piston rod 3 forms the first electrode and is connected through a lead 9 connected through an insulating terminal (not shown) to appropriate terminals of an appropriate measurement device. The tube rod 7 forms a second electrode which is connected through a lead 10 to appropriate terminals of the measurement device.

Figure 2:
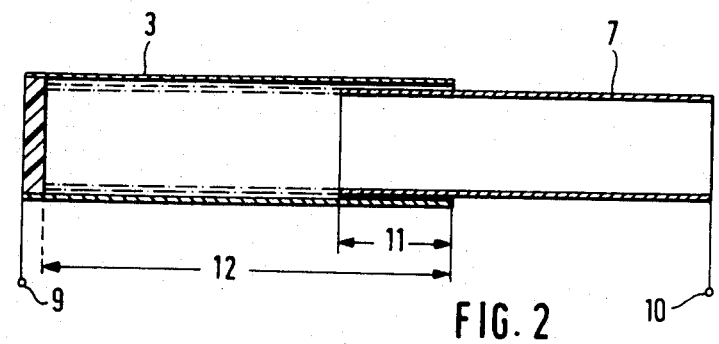
FIG. 2 shows a sectional view of a diagrammatic representation of a cylindrical capacitor.
Figure 8:
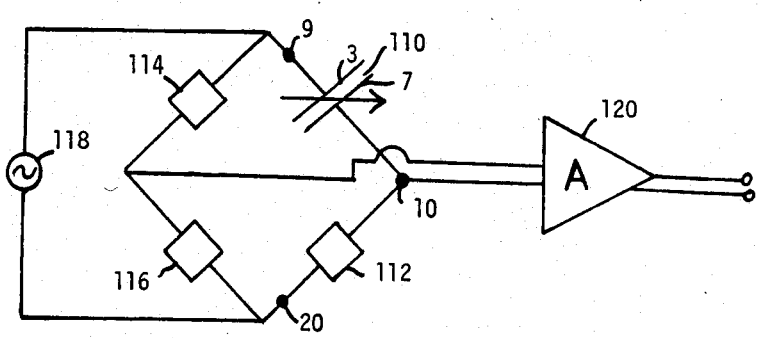
FIG. 8 shows schematically the embodiments of FIG. 1 and FIG. 7 arranged in an impedance measuring bridge.

The steepness of the change in capacitance is dependent upon the spacing between the outer surface of the tube 7 and the inner surface of the hollow piston rod 3, and on the medium present between them. The hollow piston rod 3 is arranged coaxially with and is concentrically spaced from the tube 7; a space between them receives the dielectric which may be a damping medium such as oil, or even a dielectric solid between the facing surfaces of the tube 7 and the piston rod 3. In FIG. 2, there is diagrammatically illustrated a cylindrical capacitor, the first electrode thereof comprising the hollow piston rod 3 and the second electrode comprising tube 7. The spacing 11 indicates a practical minimum overlap. The spacing 12 indicates the maximum overlap between the two surfaces when the piston 2 is as far to the right in FIG. 1 as it can move. These overlaps produce a minimum and maximum capacitance when appropriately converted, and represent the minimum and maximum travel positions of the piston. By interpolating between these extremes, the position of the piston in the cylinder is indicated by a capacitance thereinbetween. The leads 9 and 10 serve, for example, for connection to a capacitance measuring bridge as shown in FIG. 8 infra.

Figure 3:
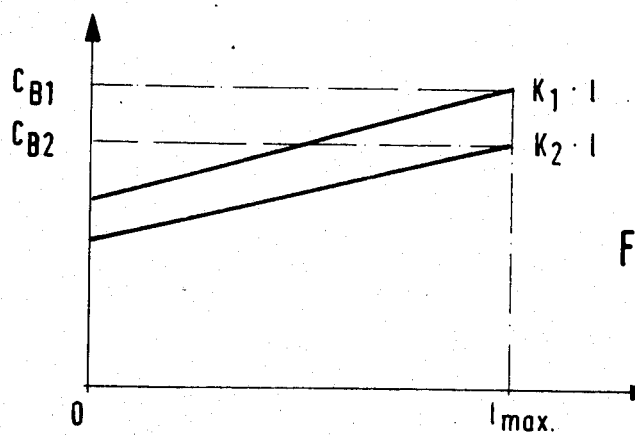
FIG. 3 shows a diagram of capacitance of the cylindrical capacitor of FIG. 2 with respect to piston position or piston travel.

FIG. 3 shows a diagram in which the capacitance of such a cylindrical capacitor is plotted against piston position or travel. It is seen from FIG. 3 that the change in capacitance is proportional to the travel of the piston, and the steepness of the curve is dependent on the ratio of the inside radius of the bore in the piston rod to the outside radius of the tube 7 as well as the relative dielectric constant $E_r$. The relative dielectric constant $E_r$ is predetermined in any known embodiment by the characteristics of the damping medium used. The two solid straight lines show two different cylindrical capacitor arrangements having, for example, different maximum overlapspacings between the piston rod 3 and the tube, or relative dielectric constants $E_r$ of the dielectric.

Figure 4:
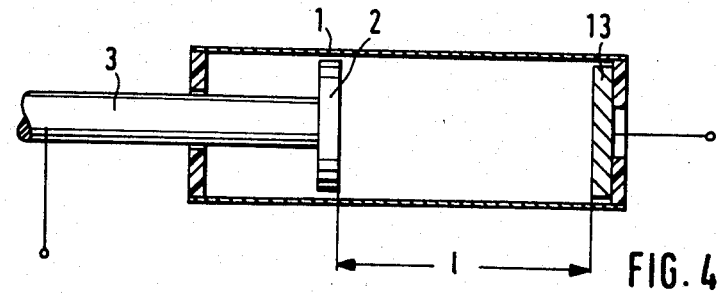
FIG. 4 shows a sectional view of a further embodiment of a vibration damper, in which the face of the piston and the base of the cylinder form plates of a capacitor.

FIG. 4 shows diagrammatically an alternative, second capacitive embodiment of the invention illustrating a vibration damper again having a cylinder 1, a piston 2 and a piston rod 3. The piston 2 and the base 13 of the cylinder respectively form the first and second electrodes of a capacitor. The base 13 of the cylinder 1 is mounted in this cylinder 1 but insulated therefrom so that a desired change in capacitance can be obtained by varying the distance between the piston 2 and the base 13 of the cylinder 1. By appropriate conversion of the measured value, likewise in this embodiment, the position of the piston can be obtained.

Figure 5:
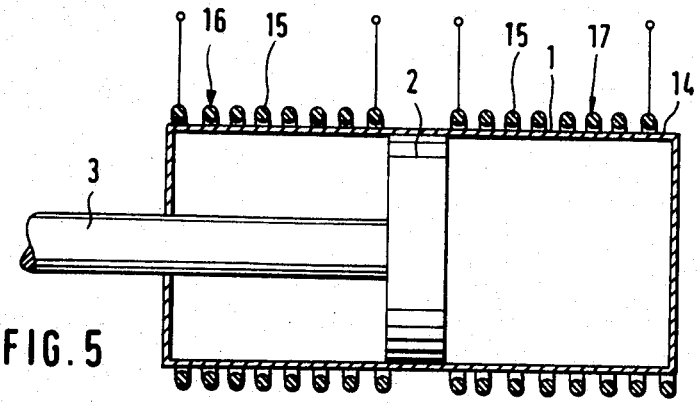
FIG. 5 shows a sectional view of a cylindrical vibration damper wherein an inductive coil is disposed on the surface of the cylinder.

As an alternative inductive embodiment, there is shown in section in FIG. 5, a vibration damper wherein again the principal components are the cylinder 1, the piston 2 and the piston rod 3.

The outer surface 14 of the vibration damper cylinder 1 is provided with windings 15, comprising a first coil 16 and a second coil 17, for respective generation of a magnetic field. The coils 16 and 17 when connected appropriately as the arms of a half-bridge generate a positional signal indicative of the position of the piston 2.

The resultant inductive half-bridge generates a bridge voltage determined by the degree or position of the insertion of the piston 2 in the damper cylinder, so that, a suitable signal corresponding to the piston travel is produced.

Figure 6:
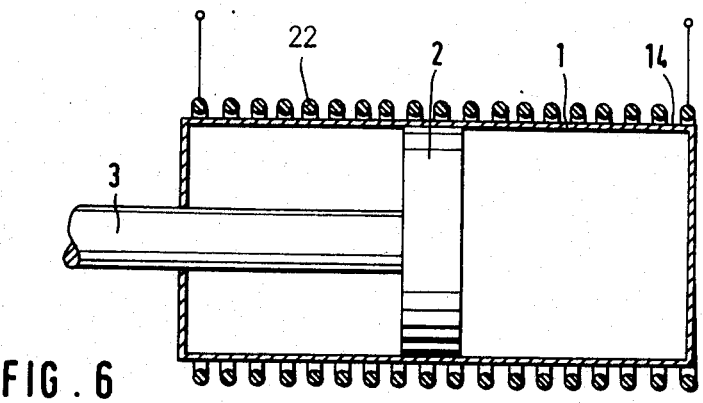
FIG. 6 shows a sectional view of a vibration damper with another coil arrangement.

FIG. 6 shows a modified inductive embodiment. The principal components of a vibration damper are here again the cylinder 1, the piston 2 and the piston rod 3. This piston rod 3 does not have to be made hollow in the embodiments using inductance. A winding is disposed on the outer surface of the vibration damper cylinder 1 extending preferably over at least the entire range of travel of the piston. On insertion of the piston within this region, there is a resulting change in inductance which can be correspondingly evaluated. The piston rod 3, at least, in FIG. 5 and FIG. 6, is preferably made of a ferromagnetic material in order to vary the inductance as much as possible from one relative position of the piston 2 and piston rod 3 to another position thereof.

Figure 7:
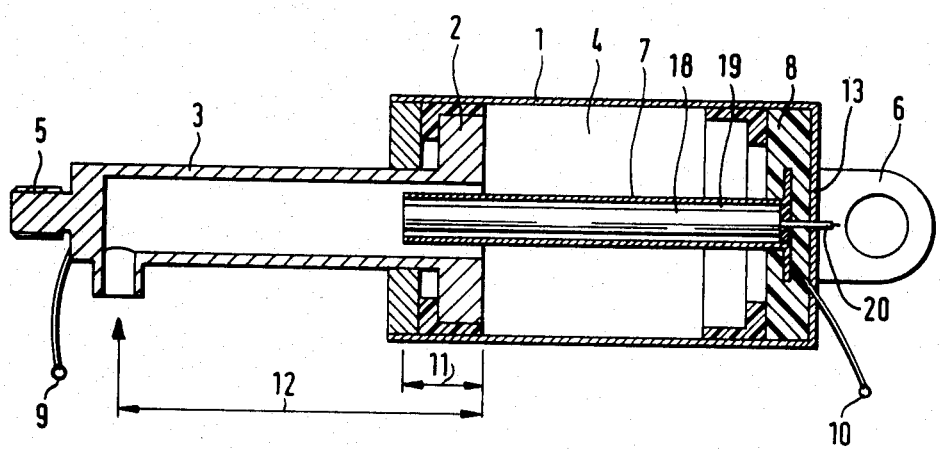
FIG. 7 shows a sectional view of a vibration damper in which the tube forms, with a further cylindrical tube, a second fixed capacitor.

The vibration damper illustrated in FIG. 7 comprises a fourth capacitance embodiment of the invention which is made up of basically the cylinder 1, the piston 2 and the piston rod 3 as in FIG. 1. Within the interior cavity 4 of the cylinder 1, there is the damping medium serving for damping vibrations. As in the embodiment of FIG. 1, mounting means 5 and 6 are provided for mounting the damper in the vehicle in a manner well-known in the prior art. The piston rod 3, which is made hollow, can slide telescopically over the tube 7, the tube 7 being secured in the cylinder in an insulating body 8 and being insulated with respect to the remainder of the components of the damper. The hollow piston rod 3 and the tube 1 form together the cylindrical capacitor. The damping medium present in the interior cavity 4 preferably forms the dielectric for the capacitor as in FIG. 1. The hollow piston rod 3 forms the first electrode and the tube 7 forms the second fixed electrode and is connected through the lead 10, passing through an insulated terminal arrangement (not shown), to the input of an appropriate measurement device such as shown in FIG. 8 infra.

The steepness of the change in capacitance is dependent upon the spacing between the outer surface of the tube 7 and the inner surface of the hollow piston rod 3 and on the dielectric medium present between them. The hollow piston rod 3 is arranged to be coaxial with and spaced from the tube 7; the space between them receives a suitable dielectric.

The spacing 11 represents the minimum overlap and the spacing 12 the maximum overlap between the two surfaces, producing accordingly a minimum and a maximum capacitance, which, appropriately converted, indicate the momentary piston travel, i.e., the position of the piston in the cylinder.

Secured within the cylindrical interior 19 of the tube 7 is a further tube 18 which is likewise arranged spaced from the tube 7. Between the two tubes, the damping fluid here again acts preferably as a dielectric as in FIG. 1; the dielectric may be solid. By the fixed arrangement of the two tubes 7 and 18 with respect to one another, there is produced a capacitor having a fixed capacitance at a particular temperature and pressure. The cylindrical tube 18 which acts as the further electrode is mounted in the insulating body 8 of the cylinder again in an insulating manner and is connected to the measurement receiver through a lead 20. The tube 7 and the tube 18 again form a tubular circular capacitor which serves for compensation of the measurement signal deviation caused by the pressure and temperature influence between the tube 7 and the piston rod 3. The manner of operation of the overall system is well-known in the prior art of Wheatstone Bridge as a capacitive half-bridge.

In FIG. 8, a schematic diagram is shown representing a bridge circuit 108, e.g., an impedance Wheatstone Bridge, for sensing the changes in capacitance of a variable capacitor 110 formed by the tube 7 and the hollow piston rod 3. The leads 9 and 10 are connected in the bridge 108 so that the capacitor 110 forms half on one arm of the bridge 108. Either a fixed capacitor external to the vibration damper or a temperature variable capacitor, as shown in FIG. 7, and formed by the tube 7 and the tube 18, comprises a capacitor 112 forming one-half of the bridge 108 connected to the capacitor 110. Two other impedance elements, such as capacitors, 114 and 116, form the other half of the bridge 108. Series capacitors 110 and 112 form one arm and the series impedances 114 and 116 form the other arm of the bridge 108. A generator 118, preferably supplying alternating current, is connected across the bridge 108 at the connectors between the capacitors 110 and the impedance 114 and the capacitor 112 and the impedance 116. The operation of a Wheatstone Bridge is well-known in the electrical prior art.

It is within the purview of the invention that this generator 118 may also be a generator of direct voltage if the impedance levels of the bridge 108 are appropriate therefor. Alternatively, within the purview of the invention, a pulse generator may also be used under special circumstances. The terminal 10 forms one input of an amplifier 120; a junction of the impedances 114 and 116 forms the other input of the amplifier 120 which generates a signal proportional to the position of the piston 2.

Figure 9:
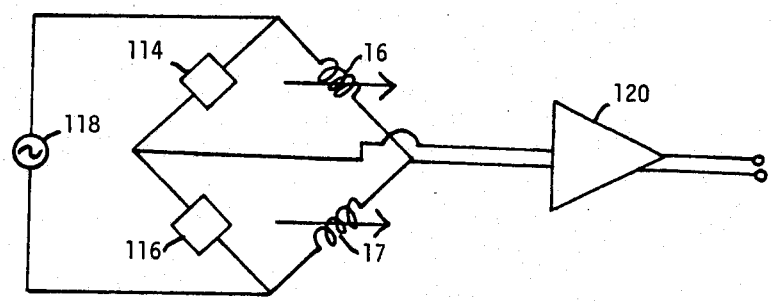
FIG. 9 shows schematically the inductive coil arrangement of FIG. 5 connected into an impedance measuring bridge.

In the case of the inductive coil embodiment of the invention as shown in FIG. 5 being adapted to the circuit in FIG. 8, the first coil 16 replaces the capacitor 110 and the second coil 17 replaces the capacitor 112 as in shown in FIG. 9. The other impedances 114 and 116 are preferably replaced by capacitors.

However, other impedance elements may be used for capacitors 114 and 116 if their impedance is chosen appropriately in a manner which is well known in the impedance bridge art.

For example, if the capacitive impedances 110 and 112 in FIG. 8 both increase by the same percentage amount due to change in the mutual dielectric because of temperature, pressure, etc., the voltage at the terminal 20 will remain constant, as is well-known in the art of electrical bridge measurements such as the Wheatstone Bridge.

Figure 10:
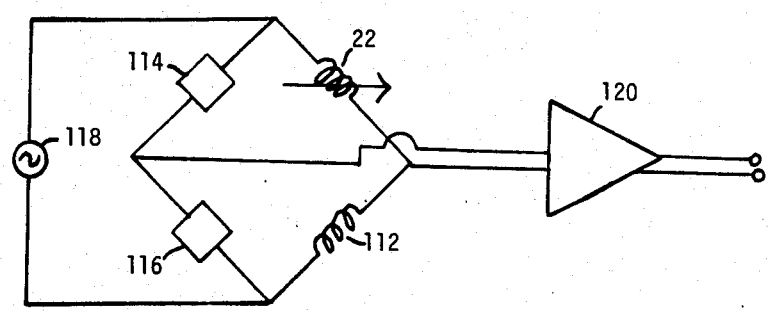
FIG. 10 shows schematically the coil arrangement of FIG. 6 connected into an impedance measuring bridge.

FIG. 10 shows the coil arrangement 22 of FIG. 6 connected into the bridge 108 replacing the capacitor 110.

Figure 11:
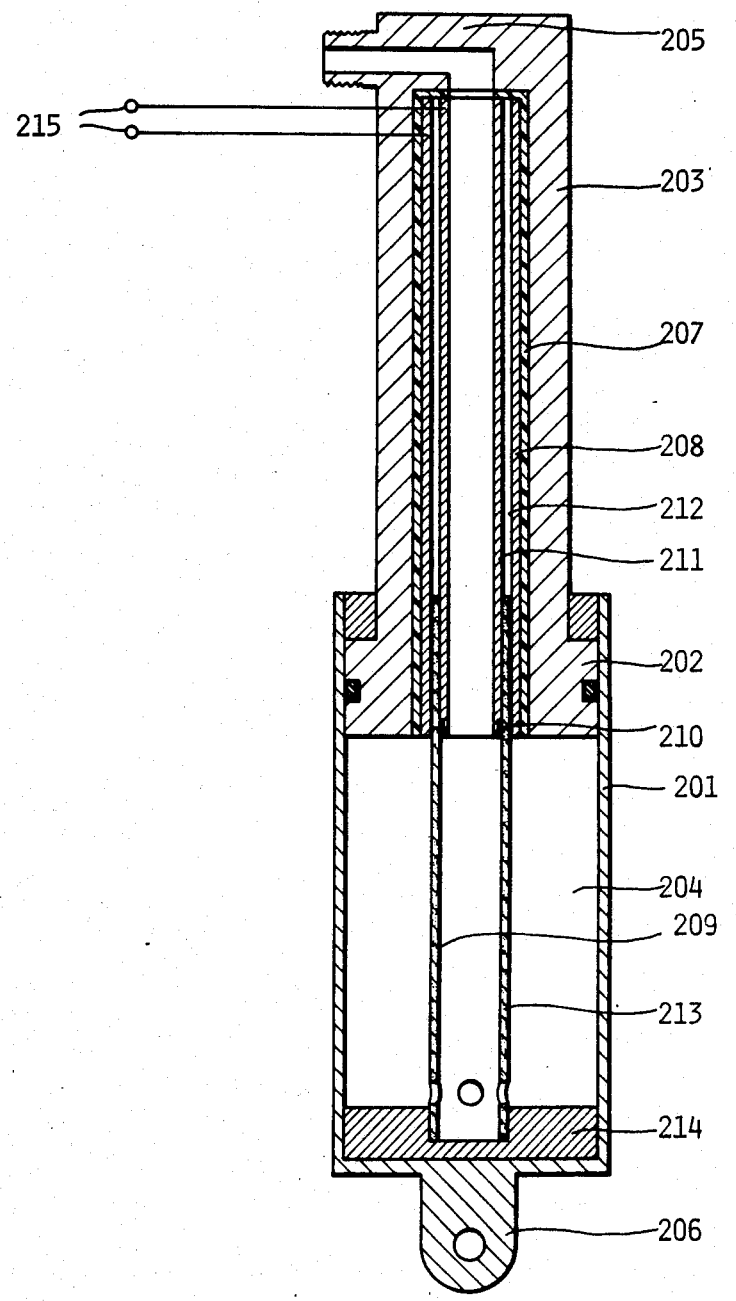
FIG. 11 shows a sectional view of another embodiment of which a tubular capacitor is arranged in the interior of the piston rod.

The vibration damper illustrated in FIG. 11 generally comprises the cylinder 201, the piston 202 and the piston rod 203. In the interior cavity 204 of the cylinder 201, there is provided a damping medium serving for damping the vibrations. Attachment means 205 and 206 are provided for mounting the vibration damper on the vehicle.

The piston rod 203 is made hollow, and therewithin are disposed a first electrode 208 and the second electrode 211. The first electrode 208 is insulated from the piston rod 203 by an insulating layer 207. Between the first electrode 208 and the second electrode 211 is a gap 212.

Since the first electrode 208 is substantially concentric to and spaced away from the second electrode 211, the tubular body 213, which is secured to the base 214 of the cylinder 201, can enter the gap 212 axially during operation of the damper in the vehicle. By the entry of the tubular body 213, a variation occurs in the capacitance between the first electrode 208 and the second electrode 211.

In the specific embodiment of FIG. 11, a ceramic tube is provided as the tubular body 213. The variation in capacitance arises because of different dielectric characteristics of the ceramic tube and the rest of the medium which may be oil.

The ceramic tube and the mineral oil which is present as the damping fluid each have a different dielectric constant, and on insertion of the ceramic tube 213 in the gap 212, the immersed surface of the ceramic tube acts as a different dielectric from oil.

In order to eliminate as far as possible the effect of the oil in the gap, between the electrode 211 and the ceramic tube 213, the ceramic tube 213 is provided with an electrically conducting surface on its inner cylindrical surface 209. This conducting surface is electrically connected to the second electrode 211 by an electrically conducting ring 210 provided on the outer surface of the second electrode 211. Since the inner cylindrical surface 209 electrically becomes a part of the second electrode 211, the oil in the gap between the second electrode 211 and the ceramic tube 213 does not have any electric field generated therein. Therefore, this gap does not produce any capacitive effect and thereby variations in this gap due to tolerances, wear of the parts, etc., do not deleteriously affect the performance accuracy.

By virtue of the arrangement of the electrodes 208 and 211 either in the hollow piston rod 203 or in the cylinder 201, structurally preferred possibilities are provided for making the connections for the leads 215. The leads could be made to terminate as connecting terminals on the outer surface either of the cylinder 201 or the piston rod 203. The electrodes 208 and 211 are held fixed relative to one another. The tubular body 213 is fixed also; however, the tubular body is mounted in the cylinder 201 so that during operation of the vibration damper, a telescopic displacement of the components within each other takes place, and the tubular capacitor can perform as desired.

Figure 12:
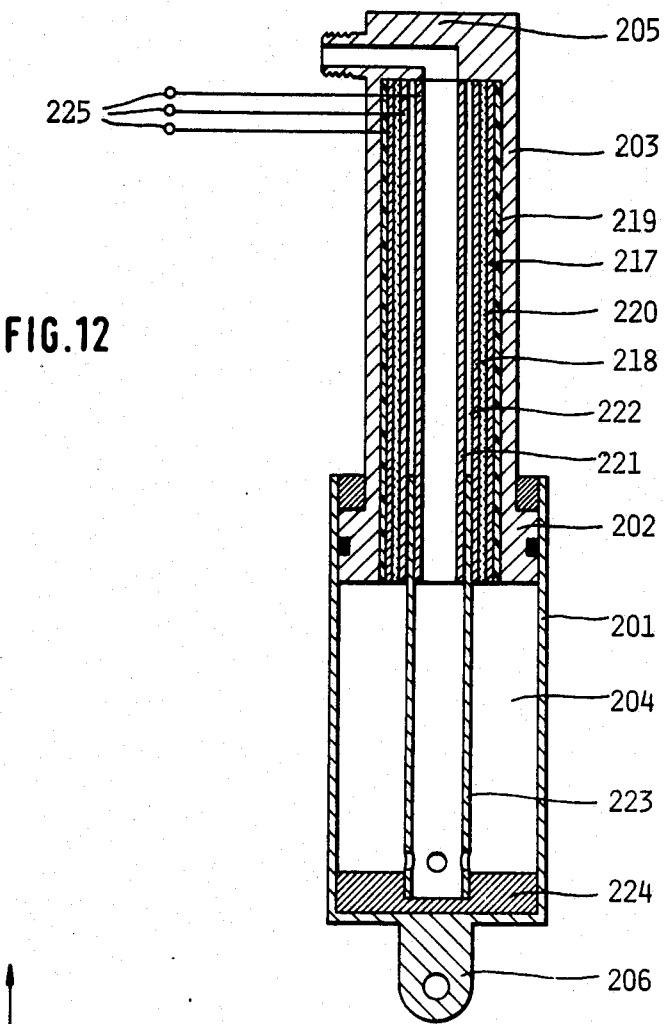
FIG. 12 shows a sectional view of a vibration damper in which a second fixed capacitor is mounted in the interior of the piston rod.

The vibration damper illustrated in FIG. 12 comprises substantially the cylinder 201, the piston 202 and the piston rod 203. In the interior cavity 204 of the cylinder 201, there is the damping medium serving for damping the oscillations. Securing devices 205 and 206 are provided as attachment means for mounting the damper in the vehicle.

Provided in the piston rod 203, which is made hollow, are the first electrode 217 and the second electrode 218. The first electrode 217 is insulated with respec to the piston rod 203 by a tube 219 of, for example, synthetic resin. A dielectric 220 is disposed between the first electrode 217 and the second electrode 218.

Spaced away from the second electrode 218 is a third electrode 221. The tubular body 223 is disposed to be able to enter the intermediate space 222 between the second electrode 218 and the third electrode 221 during active functioning of the damper in the vehicle. By the insertion of the tubular body 223 into the space 222, there occurs a change of capacitance between the second electrode 218 and the third electrode 221. The first electrode 217 forms, together with the second electrode 218, a fixed capacitance by contrast. The space 222 may be filled with a dielectric fluid, e.g., mineral oil.

Preferably, as illustrated, the tubular body is metallic; with the use of an electrically conducting tubular body 223, the latter must be earthed through the insulating body 224 of the cylinder. This results in the following manner of operation: with the piston rod 203 extended, the three electrodes form two fixed capacitances of known magnitude. On inward movement of the grounded electrically conducting tubular body 223, the capacitance between the second electrode 218 and the third electrode 221 is reduced because the effective capacitive surface area is diminished.

As an alternative in regard to the material of the tubular body 223, it is also possible for the tubular body 223 to be made in the form of an electrically non-conducting tube. For example, a tube of synthetic resin is suitable for this purpose. If a synthetic resin tube is provided to form the tubular body 223 then on entry of the synthetic resin tube between the second electrode 218 and the third electrode 221, there is produced a parallel circuit of two capacitors. The two capacitances of different values arise by the different dielectrics so that the overall capacitance of the second electrode 218 and the third electrode 221 results from the addition of the two individual capacitances. These different values of capacitance arise partly since the synthetic resin tube and the mineral oil which may be present as the damping fluid, each have different dielectric constants. If the tubular body 223 is made of synthetic resin, on insertion of the synthetic resin tube, the inserted surface area of the tubular body 223 acts as a dielectric.

The variable capacitance follows the formula:

$$C_{ges}(1) = C_a + C_b$$

where:

$C_{ges}$ = overall capacitance
$C_a$ = the individual capacitance of the first medium (e.g. Mineral oil)
$C_b$ = the individual capacitance of the second medium (e.g. Synthetic resin)

Figure 13:
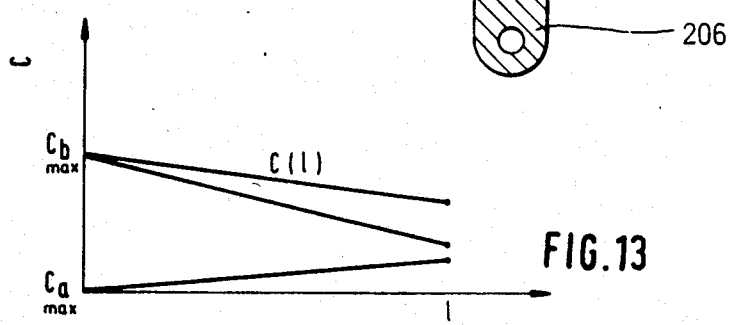
FIG. 13 depicts a piston travel/capacitance diagram for a cylindrical capacitor.

In FIG. 13, a diagram is shown in which the capacitance for such a cylindrical capacitor is drawn against piston travel or displacement. The individual capacitance $C_a$ falls steadily on insertion of the piston 202, whereas the individual capacitance $C_b$, in which the tubular body 223 is used as the dielectric, steadily increases. The two individual capacitances add up and form the resultant characteristic lin $C_{ges}$.

By the disposition of the electrodes 217, 218 and 221, either within the hollow piston rod 203 or in the cylinder 201, there are advantageous possibilities for making connections to the leads 225 since these only need to be mounted as connecting pins on the outside surface of either the cylinder 201 or the piston rod 203. The electrodes are advantageously kept fixed relative to one another, and the tubular body 223 is likewise fixed, but in the other component. Accordingly during the action of a vibration damper, a telescopic displacement of the parts within one another takes place, so that the desired measured variable capacitance is formed.

Figure 14:
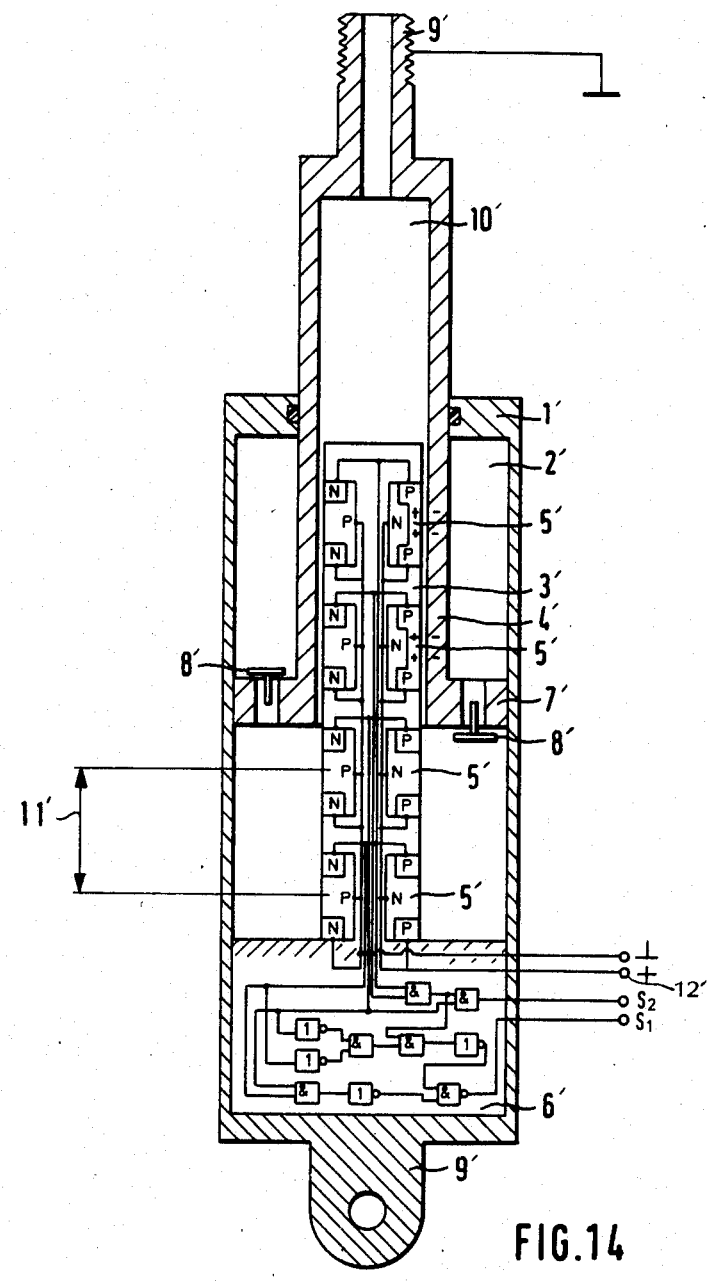
FIG. 14 shows, in cross section, a piston-cylinder unit, in the form of a vibration absorber, having semiconductor elements therein.

The equipment illustrated in FIG. 14 comprises essentially a cylinder 1', an interior portion 2' of which a piston rod 4' guides an axially-movable piston 7'. Such a vibration absorber is filled in the interior portion 2' ot the cylinder 1' with at least one damping medium. The piston 7' thereby serves as a vibration absorber, whereby there are valves 8' which perform a throttling function. To fasten the assembly between a wheel mount and the body, there are fastening devices 9'.

The piston rod 4' is provided with a cavity 10' into which a beam 3' is inserted. The beam 3' permits a free axial movement of the piston 7' in the cylinder 1'. The beam 3' is equipped with semiconductor elements 5', which are preferably located in the beam 3' at uniform intervals over a range of, or the entire axial stroke length of, the piston 7'. The distance 11' between and the density of the individual semiconductor elements 5' is determined by the specified measurement value resolution required for a desired application. Depending on whether these semiconductor elements 5' are closer to or farther from one another, when these semiconductor elements 5' are covered by the piston rod 4', a signal corresponding to the resolution of the semiconductor elements 5' and the location of the piston 7' is sent to the electronic calculating or computing circuitry or system 6'. For this purpose, in this embodiment, the piston rod 4' is designed as an electrode, and either has an electrical voltage source connected thereto, or is connected to ground. An electrical voltage source 12' is chosen having such a voltage that an electric field is set up between the semiconductor elements 5' and the piston rod 4' with its connected piston 7', which is sufficiently large to form a gate channel, such as that of a field effect transistor in the semiconductor elements 5' immediately adjacent to the piston rod 4' with its connected piston 7' thereby actuating these adjacent semiconductor elements 5' by either turning them on or off, depending upon whether the semiconductor elements 5' are designed and manufactured to operate in their enhancement mode or their depletion mode.

The operational characteristics of the equipment are preferably chosen so the fact that the semiconductor elements 5', which are covered by the hollow piston rod 4', have a conductive channel, which is either P-conducting or N-conducting, depending on the design of the semiconductor elements 5' and on the relative potential on the piston rod 4' with respect to the semiconductor elements 5'. In FIG. 14, the piston rod 4' is connected to ground, and the semiconductor elements 5' are therefore chosen to be P-conducting and are connected to the power supply 12', which is positive. This conductivity state means that there is a "high" signal at the inputs of the digital computing elements.

The inputs of the digital computing elements from the semiconductor elements 5', which are not covered by the hollow piston rod 4', are in the "low" state. By connecting the digital computing elements according to a determined solution algorithm, a two-place digital distance signal is produced, which reflects the following four states and, therefore, the corresponding positions of the piston 7'.

| $S_1$ | $S_2$ | Distance (mm) |
|---|---|---|
| 0 | 0 | 0–40 |
| 0 | 1 | 40–80 |
| 1 | 0 | 80–120 |
| 1 | 1 | 120–160 |

This table describes one example.

The semiconductor elements 5' are connected to an electronic calculating circuit 14'. One example of such a circuit is shown in FIG. 14, which has AND circuits and inverter circuits interconnected as shown.

Figure 15:
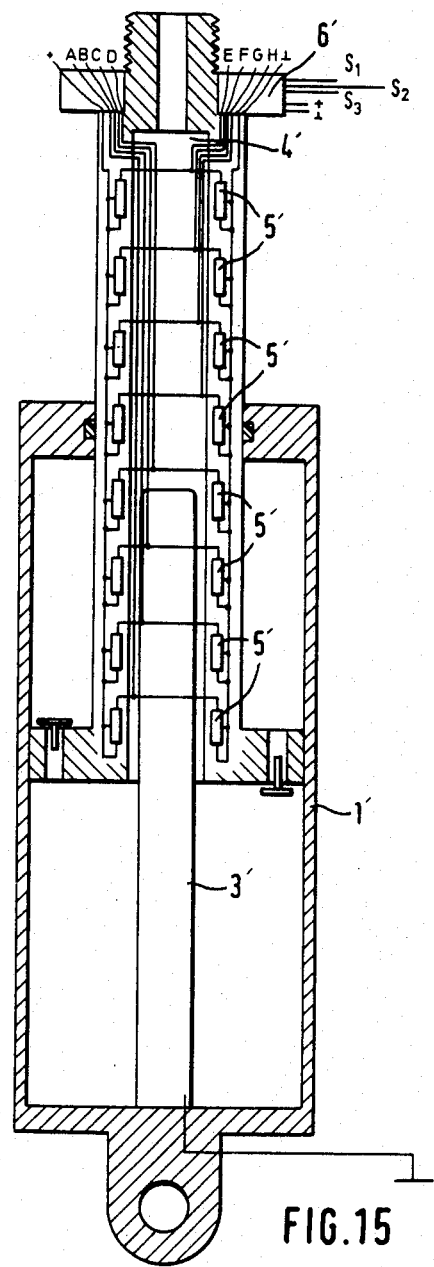
FIG. 15 shows another embodiment of the piston-cylinder component illustrated in FIG. 14, with the distinction that the semiconductor elements are an integral part of the piston rod.

FIG. 15 shows a vibration absorber, basically like the one illustrated in FIG. 14, in which the beam 3' is designed as an electrode, with either an electrical voltage or a ground potential connected thereto. The semiconductor elements 5' are arranged on the inside surface of the hollow piston rod 4' and insulated therefrom and one another in such a way that when there is a telescopic displacement of the piston rod 4' in relation to the cylinder 1', a corresponding overlap is achieved between the semiconductor elements 5' and the beam 3', so that, again, a corresponding measurement signal is sent to an electronic calculating or computing circuit or system 6'. The semiconductor elements 5' are interconnected by a series of conductors A through H, which in turn are connected to the electronic calculating system 6'. The electronic calculating system 6' is preferably connected in an analogous fashion to the electronic circuit of FIG. 14. Electronic circuits of this type are very well known in the art and are used, among other applications, in digital watches, etc. Otherwise, this embodiment corresponds in terms of its function as a vibration absorber to the embodiment already illustrated in FIG. 14.

Figure 16:
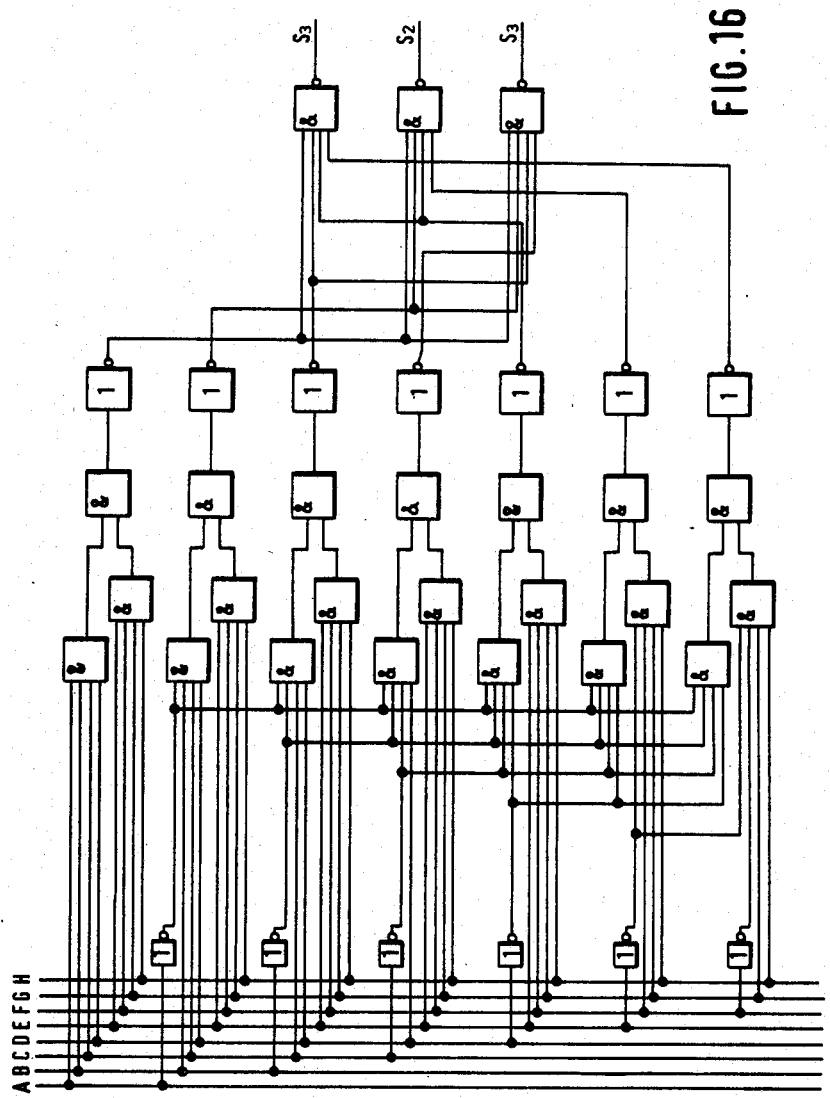
FIG. 16 shows a circuit diagram of an electronic computing system.

FIG. 16 shows a circuit diagram of an electronic calculating system, like that identified as 6' in FIG. 15. The states which are assumed by the semiconductor components as a function of the piston travel are transmitted via the connections A to H. The 3-place digital word $S_1$ to $S_3$ represents the digital distance signal, which can be directly processed in a digital electronic computing system.

Figure 17:
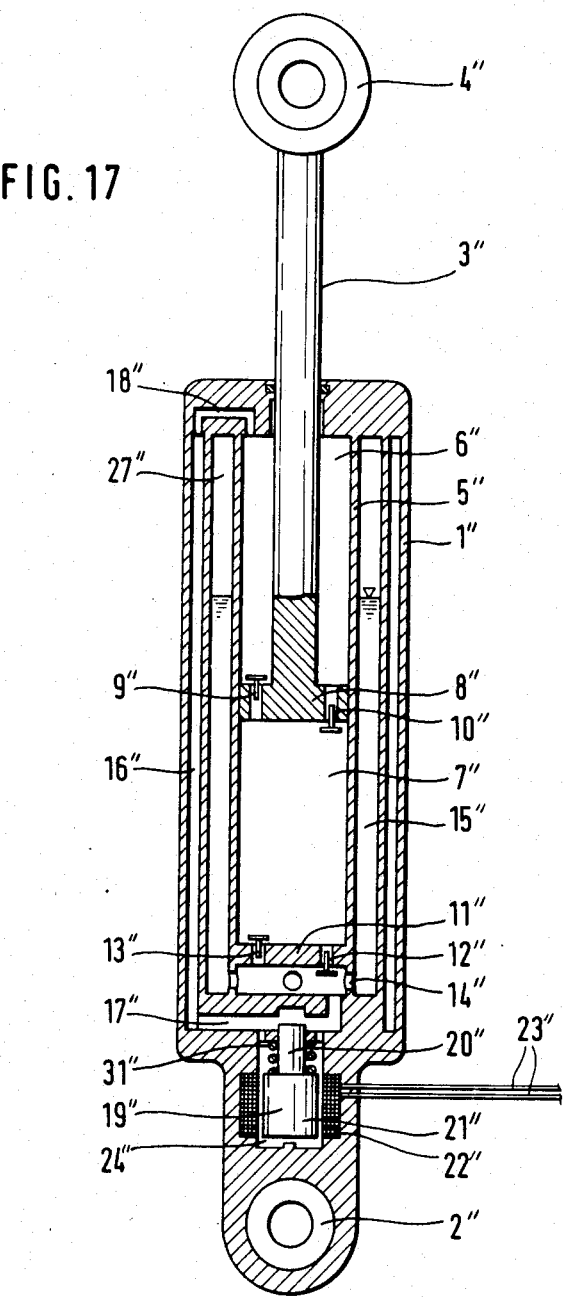
FIG. 17 shows a damping element including an electronically-controllable damping valve in cross section.

FIG. 17 shows the schematic illustration of a hydraulic vibration damping apparatus including the housing 1″, which is connected by means of a lower coupling member 2″ with a support wheel guidance element not shown), and the piston rod 3″, which is fastened by means of the upper coupling member 4″ to the vehicle body. A work cylinder 5″ is provided and includes the upper work chamber 6″ and the lower work chamber 7″ that are separated from one another by a damping piston 8″ fastened to an end of the piston rod 3″.

The damping piston 8″ is equipped with a pressure damping valve 9″ and a traction damping valve 10″. In the bottom 11″ of the work cylinder 5″ there is provided another pressure damping valve 12″ and a check valve 13″. By means of the openings 14″, the fluid volumes displaced by the piston rod 3″ are displaced into the equalization chamber 15″.

The annular space 16″ outside of the equalization chamber 15″ is connected through ducts 17″ and 18″ with the upper work chamber 6″ and the equalization chamber 15″, whereby the flow connection into the lower working chamber 7″ from the equalization chamber 15″ is provided through the openings 14″ and the check valve 13″. Operative with this flow connection is the electronically-controllable damping valve 19″, whereby the armature shaft 20″, depending on the control setting, closes the duct 17″ or allows a variable circulation of fluid through the duct 17″. The damping valve 19″ includes the armature shaft 20″, the armature 21″, the coil 22″, the spring 31″ and the electrical connection 23″. The armature chamber 24″ can be flooded with damping fluid medium.

The damping valve 19″ is controlled with electric signals through the connections 23″ by a suitable electronic system responsive to predetermined measured parameters, so that, depending on the position with which the armature shaft 20″ acts on the cross-section of the duct 17″, a determined damping characteristic can be achieved.

The equalization chamber 15″ can, in its upper region 27″, be filled with a gaseous medium, whereby, depending on the requirements and task at hand, this gaseous medium can be unpressurized or pressurized.

Figure 18:
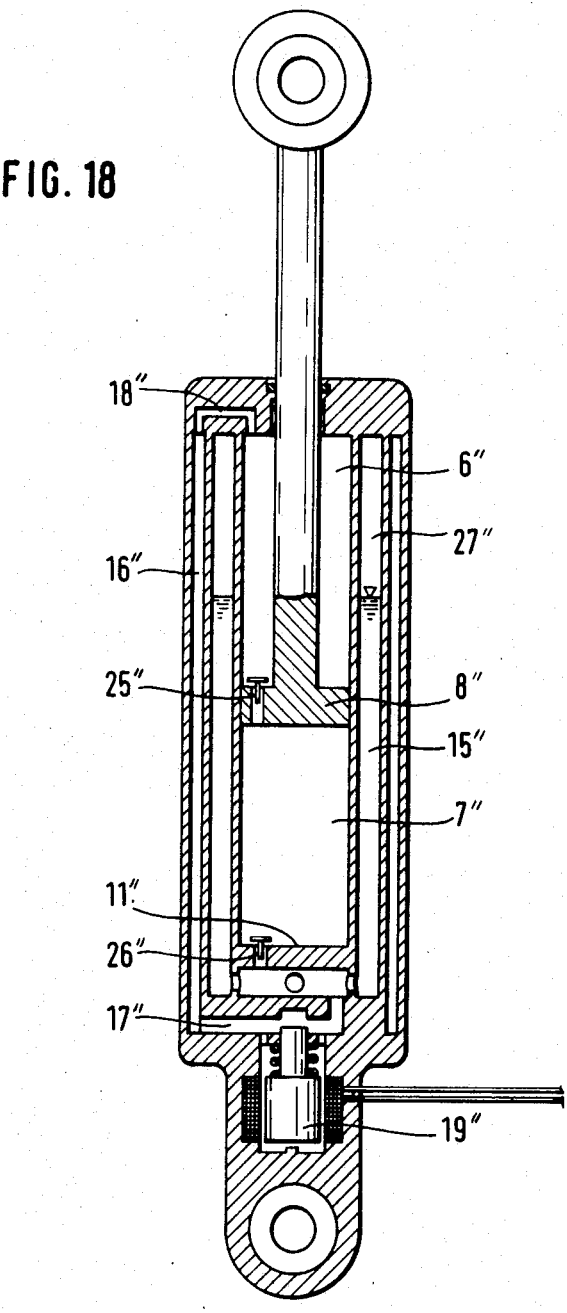
FIG. 18 shows a two-tube damper in principle like the one illustrated in FIG. 17, with the distinction that the damping medium circulates in only one direction.

FIG. 18 shows another embodiment of the present invention that is similar to the one already illustrated in principle in FIG. 17, but in which the damping piston 8″ is only equipped with a check valve 25″, and the bottom 11″ of the work cylinder 5″ is also equipped with a check valve 26″, so that the damping fluid medium can only flow in one direction of circulation. This direction of circulation runs from the upper work chamber 6″ through the duct 18″ and the annular space 16″, the duct 17″, past the damping valve 19″ and through the check valve 26″ into the lower work chamber 7″. For this damping element, the circulation of the damping medium is important, since the damping regulation provided is determined by operation of the crosssection setting of the armature shaft 20″ of damping valve 19″. The equalization chamber 15″ can, in its upper region 27″, be filled with a gaseous medium, which, depending on the task and the operating conditions, can either be pressurized or unpressurized.

Figure 19:
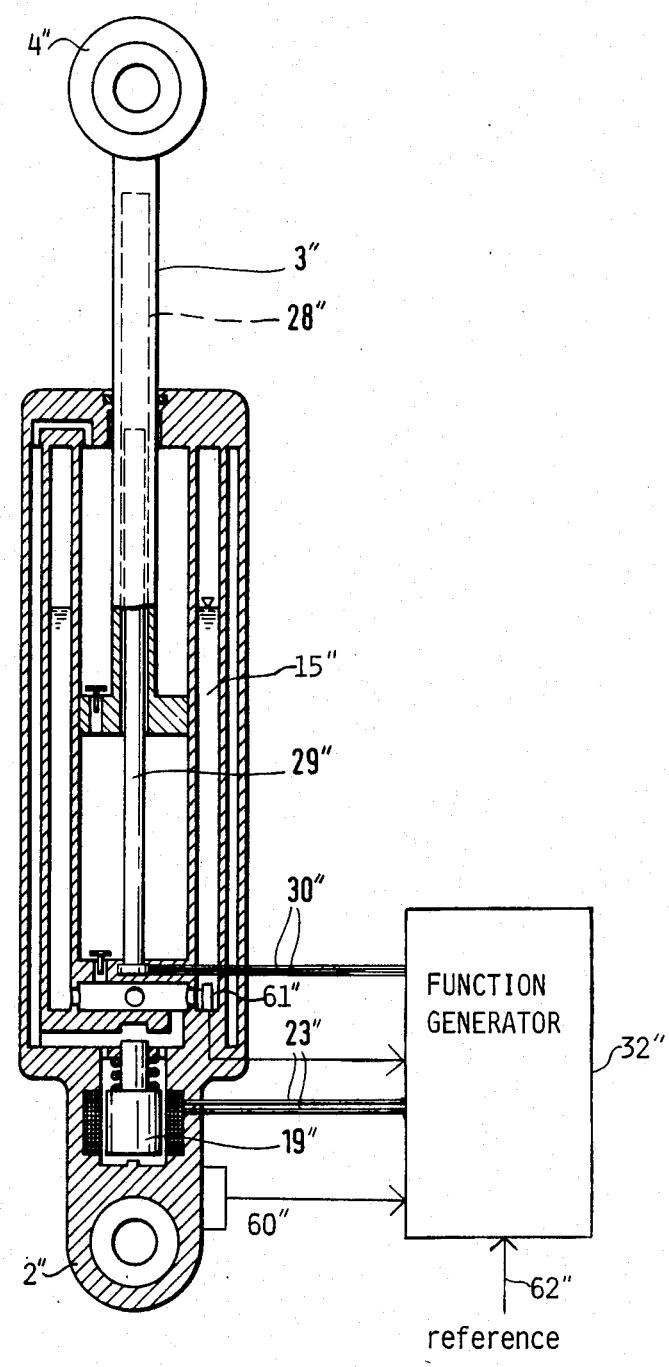
FIG. 19 shows a two-tube damper in principle like the one illustrated in FIG. 18, with a sensor integrated in the hollow piston rod and a function generator provided for operating the controllable damping valve.

FIG. 19 shows a different embodiment of the present invention that is similar to the one already illustrated in FIG. 18, with the difference that the piston rod 3″ is provided with a hollow space 28″, which is operative to hold a sensor 29″. This sensor 29″ supplies to a suitable electronic function generator 32″ through the connections 30″ a control signal corresponding to the sensed relative movement between the coupling members 2″ and 4″ as measured by the sensor 29″ and from there a control signal is provided through the connections 23″ to provide the desired control of the damping valve 19″. The sensor 29″ can be designed on the basis of a tubular capacitor, whereby the tubular components form a capacitive half-bridge.

Figure 20:
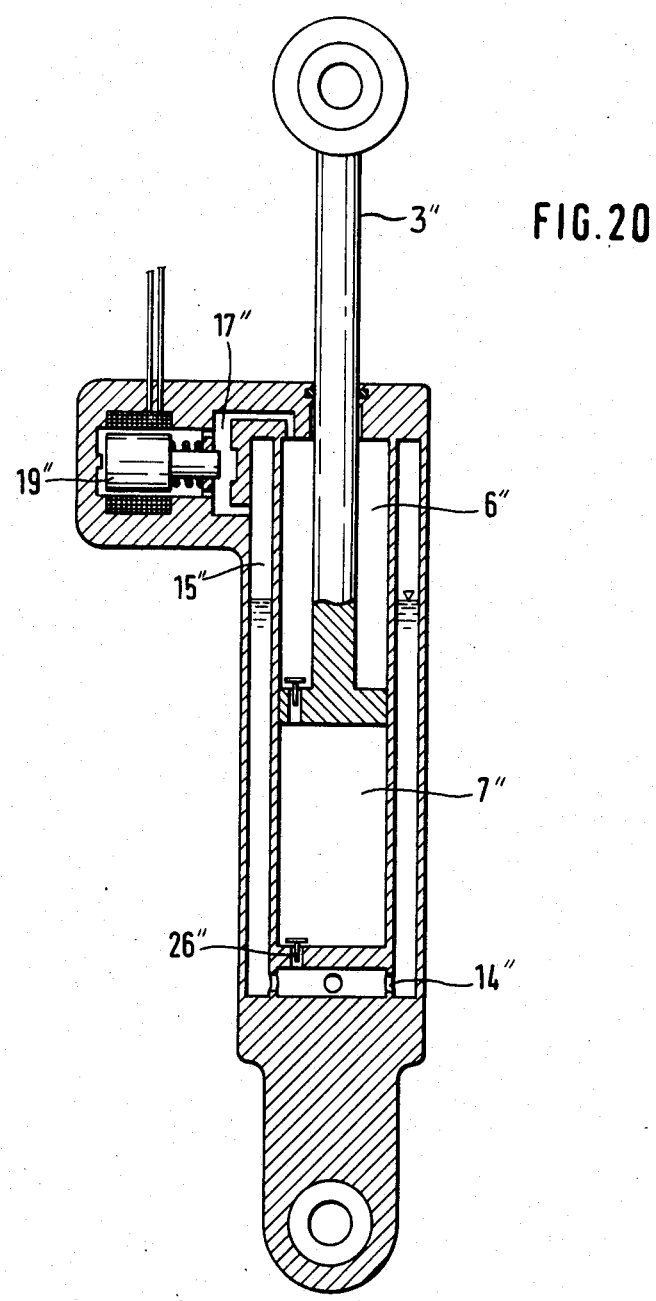
FIG. 20 shows a two-tube damper in principle like that illustrated in FIG. 18, in which the electronically-controllable valve is located laterally in relation to the longitudinal axis of the damper.

FIG. 20 shows an additional embodiment of the present invention which in principle corresponds to the one illustrated in FIG. 18, with the difference that the damping valve 19″ is located laterally in relation to the longitudinal axis of the damping piston rod 3″. Once again there is a fluid connection from the upper work chamber 6″ through the duct 17″ into the equalization chamber 15″, whereby the fluid flow connection from the equalization chamber 15″ into the lower work chamber 7″ is provided through the openings 14″ and the check valve 26″. The damping valve 19″ per se is of a design to function substantially the same as already shown and described in relation to the other embodiments.

Figure 21:
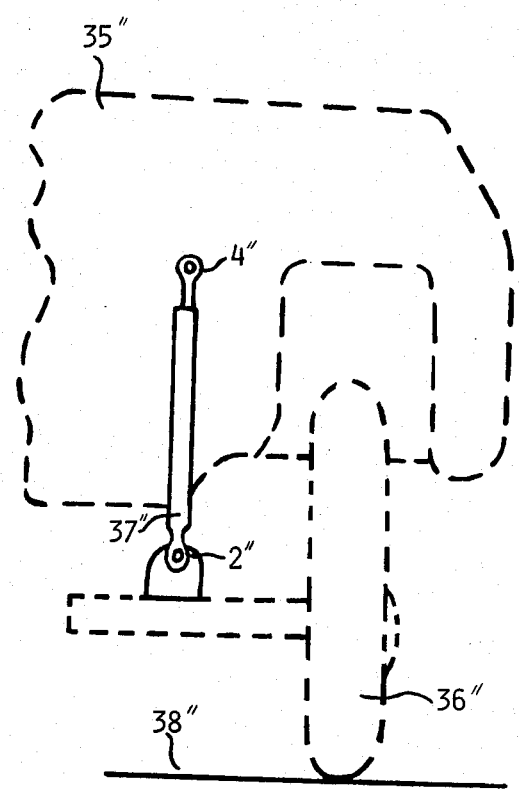
FIG. 21 shows schematically the practical application of the present hydraulic vibration damper apparatus coupled between the body and a support wheel of a vehicle.

In FIG. 21, there is schematically shown an illustrative practical application of the vibration damping apparatus of the present invention in relation to a vehicle including a vehicle body 35″ having a support wheel 36″. The hydraulic vibration damping apparatus 37″ is shown with the upper coupling member 4″ fastened to move with the vehicle body 35″ and the lower coupling member 2″ fastened to move with the wheel 36″. As the vehicle body 35″ travels along a roadway 38″ with the support wheel 36″ in contact with that roadway 38″, the support wheel 36″ will move relative to the vehicle body 35″, and the damping apparatus 37″ will operate to damp undesired vibrations and relative movements between the vehicle body 35″ and the support wheel 36″ in response to sensed relative movement between the vehicle body 35″ and the support wheel 36″.

Figure 22:
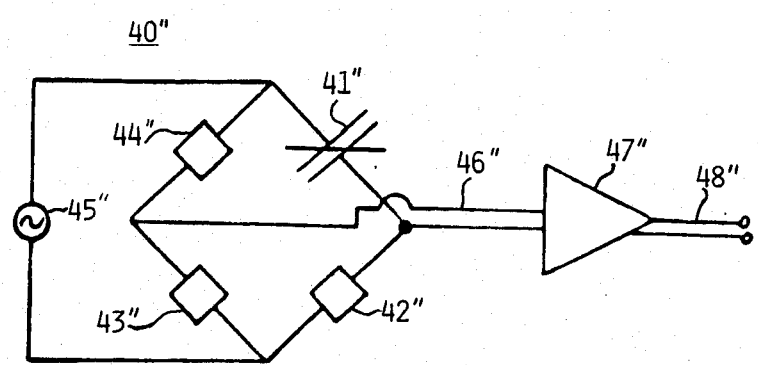
FIG. 22 shows an illustration of a suitable bridge circuit for sensing the changes in capacitance of the sensor shown in FIG. 19.

In FIG. 22 there is shown a well-known bridge circuit arrangement 40″ for establishing the relative separation movement between the vehicle body 35″ and the support wheel 36″ as determined by changes in the capacitance of the sensor 29″ through the connections 30″ relative to the hollow space 28″, as shown in FIG. 19, which functions as the variable capacitor 41″ shown in FIG. 22. The variable capacitor 41″, in conjunction with impedance element 42″ which is preferably a capacitor, forms one-half of the bridge circuit 40". The capacitance magnitude of the capacitor 41" changes in a linear relationship to the separation between the vehicle body 35" and the support wheel 36". The magnitude of impedance element 42" is selected in accordance with a desired separation therebetween. Two other impedance elements 43" and 44" form the other half of the bridge circuit 40". A signal source 45" is connected across the bridge circuit 40". The operation of such a bridge circuit 40" is well known in the electrical prior art. The output signal 46" from the bridge circuit 40" is supplied to an amplifier 47" which outputs a signal at an output 48" in accordance with the separation movement of the sensor 29" in relation to the hollow space 28" within the piston rod 3", as shown in FIG. 19. This latter movement corresponds with the movement of the lower coupling member 2" connected with the sensor 29" and in relation to the hollow space 28" within the piston rod 3" connected with the upper coupling member 4".

Figure 23:
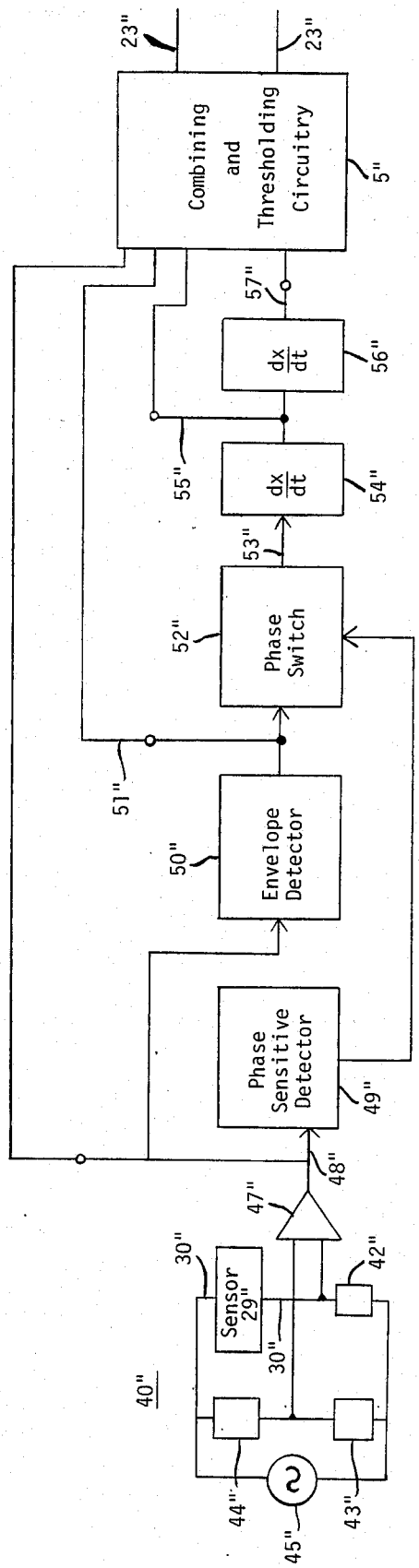
FIG. 23 shows the functional operations provided in accordance with the present invention.

In FIG. 23, there are shown the various functional operations of the vibration damping apparatus of the present invention. The bridge circuit 40" including the amplifier 47" provides the signal 48" to a phase sensitive detector 49" which senses the upward movement of the sensor 29" relative to the hollow space 28", as shown in FIG. 19, as compared with the downward movement of that sensor 29". The envelope detector 50" senses the magnitude of the signal 48" to provide an output signal 51" in accordance with the movement distance of the sensor 29". The phase switch 52" provides an output signal 53" in accordance with the magnitude and the direction of movement of the sensor 29" as provided by the signal 48". The derivative circuit 54" takes a first differential of the signal 53" to provide an output signal 55" in accordance with the velocity of the movement of the sensor 29". The derivative circuit 56" takes a second differential of the signal 53" to provide an output signal 57" in accordance with the acceleration of the movement of the sensor 29". The signals 48", 51", 55" and 57" are summed and/or combined and thresholded and/or compared with reference signals in summing and thresholding circuitry 57", which circuitry generates output signals for connection to the electrical connection 23" of the coil 22".

The function generator 32", shown in FIG. 19, can comprise a programmed microprocessor including a software program for providing the functional operations as shown in FIG. 23. If it is desired to establish the damping force provided by the present vibration damper apparatus, a strain gauge 60" can be fastened to the lower coupling member 2", as shown in FIG. 19, for this purpose. If it is desired to establish the temperature of the damping fluid provided within the present vibration damping apparatus, a temperature sensing member 61" can be provided within the equalization chamber 15", as shown in FIG. 19, or in contact with the damping fluid as may be desired. The function generator 32" which preferably includes the circuitry or functions of FIG. 23 can include one or more reference signals 62" for comparison with the sensed operating parameters of the vibration damping apparatus, such as damping force, movement distance, velocity, acceleration, temperature or frequency of operation as may be desired.

The sensed parameter signals generated can be combined (in an appropriate manner) to produce a combined or resulting difference or error signal, if desired. This resulting difference or error signal is then applied to the damping valve 19" for controlling the operation of the vibration damping apparatus.

Figure 24:
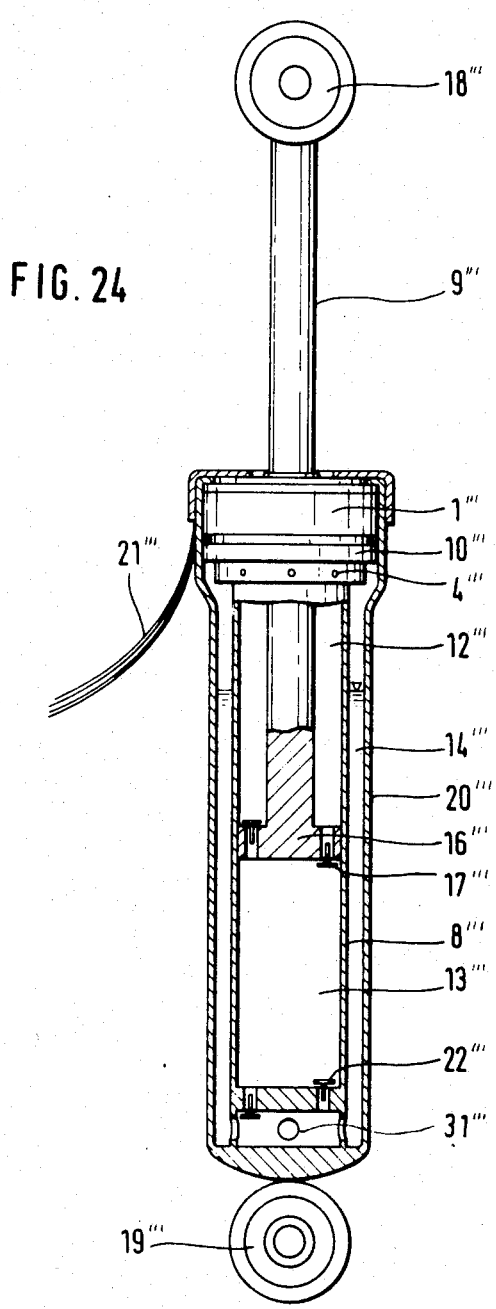
FIG. 24 shows a vibration damper in cross section.

The hydraulic vibration damper illustrated in FIG. 24 shows essentially a damping or work cylinder 8''' and a piston rod 9''', on the end of which a piston 16''' is affixed. The piston 16''' divides the interior of the damping cylinder 8''' into an upper work chamber 12''' and a lower work chamber 13'''. The piston 16''' has valves 17''', which are used for basic damping. Fasteners 18''' and 19''' are provided to fasten the vibration damper to the vehicle.

The damping cylinder 8''' is surrounded by a casing tube 20''', whereby an equalization chamber 14''' is formed in the space in between. Between the equalization chamber 14''' and the upper work chamber 12''', there are corresponding flow connections 4'''. These flow connections 4''' are a part of a guide component 10''', which simultaneously holds the damping valve 1'''. The damping force regulation takes place via the damping valve 1''', in which the flow from the upper work chamber 12''' to the equalization chamber 14''' is regulated. The electrical control of the damping valve 1''' is exerted via connection lines 21'''. The compensation of the immersed piston rod volume during operation is accomplished by means of bottom valves 22''', which connect the lower work chamber 13''' with the equalization chamber 14''' by means of orifices 31''' in a bottom portion of the hydraulic vibration damper.

Figure 25:
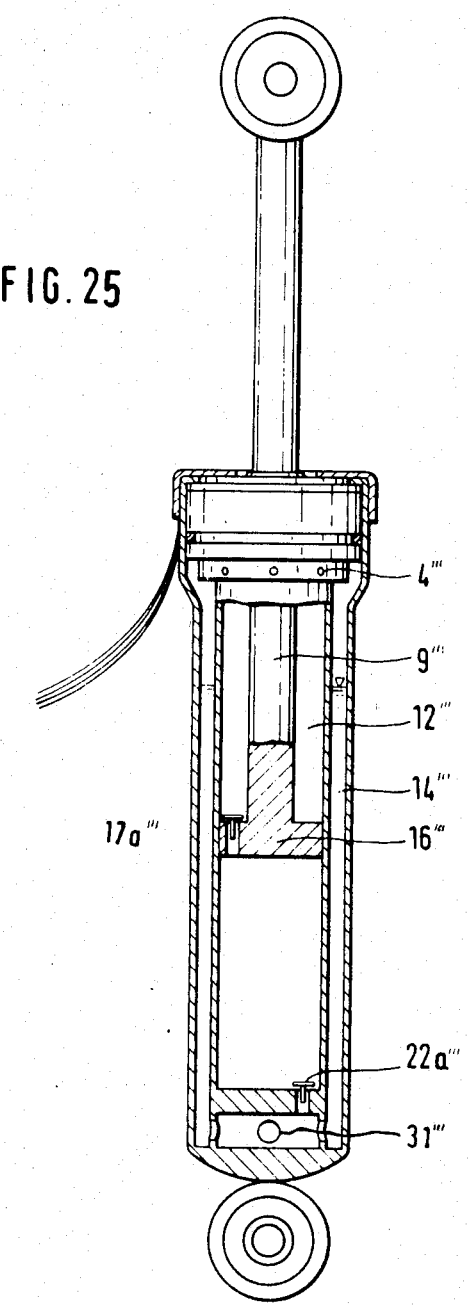
FIG. 25 shows another embodiment of the vibration damper illustrated in FIG. 24, in cross section.

FIG. 25 shows a vibration damper essentially like the one illustrated in FIG. 24, with the distinction that the piston 16''' has a valve 17a''' which acts in only one direction. The bottom valve 22a''' comprises a valve which also acts in a single direction. These valves 17a''' and 22a''' are used only for volume compensation of the immersed piston rod 9'''. As in the embodiment illustrated in FIG. 24, the damping takes place from the upper work chamber 12''' via the flow connections 4''' into the equalization chamber 14'''.

Figure 26:
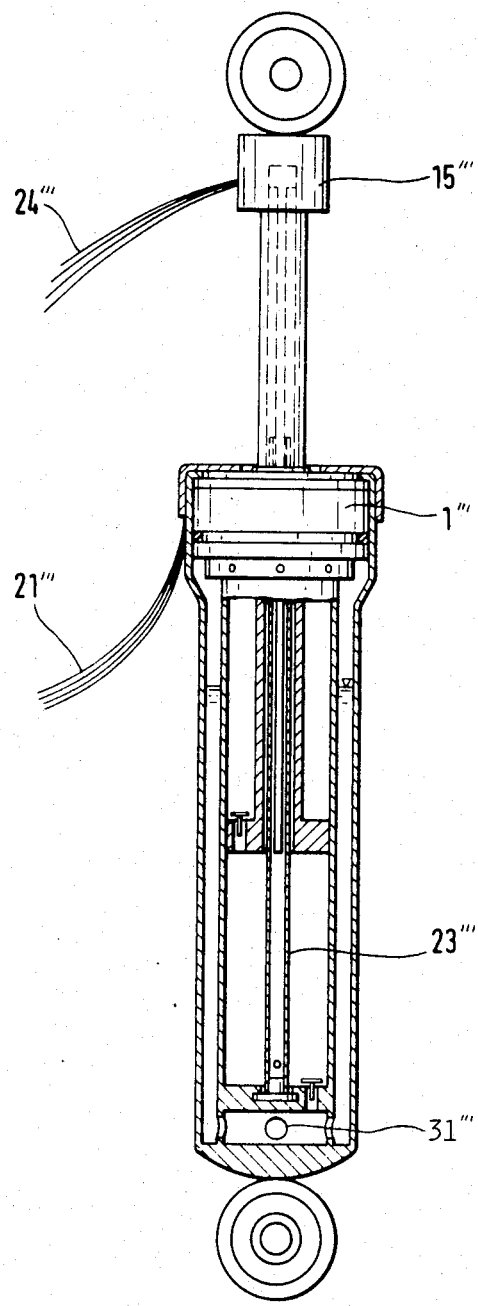
FIG. 26 shows a vibration damper, essentially like the one illustrated in FIG. 25, with an integrated sensor, in cross section.

FIG. 26, in contrast to the embodiment shown in FIG. 25, is equipped with an additional sensor 23''', which corresponds to the embodiments shown in FIGS. 1, 7, 11, and 13 supra and which collects the measurement signals via the connections 24'''. When a corresponding electronic system is used, the sensor 23''' appropriately regulates the damping valve 1''' via the connection lines 21'''. The sensor 23''' for the measurement of the piston velocity, piston travel, piston acceleration, pressure, temperature and load status is an apparatus employing the tubular capacitor principle which supplies appropriate measurement signals concerning the change in capacitance. The sensor 23''' can also use other types, however, for example as shown in the embodiments illustrated in FIGS. 5, 6, 14, 15, 19 and 23 and explained supra, which also work together with the adjustable damping valve 1''' by means of an electronic measurement system 15''', such as shown in the embodiments illustrated in FIGS. 8, 9, 10, 16, 19, 22 and 23, and explained supra.

Figure 27:
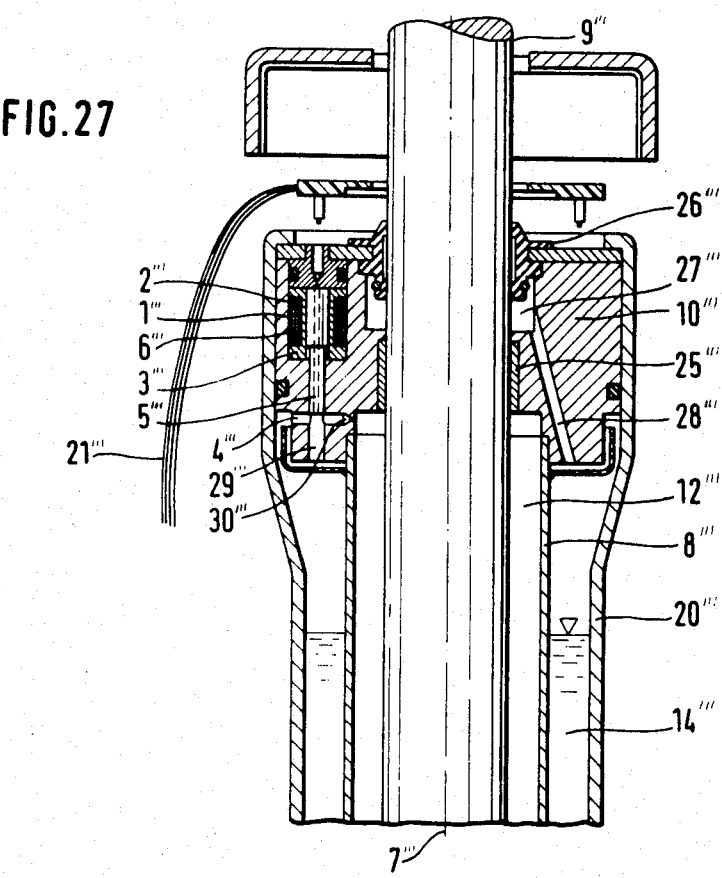
FIG. 27 shows a damping valve located in the piston rod guide component, in cross section.

FIG. 27 shows a segment of a vibration damper in cross section, in which the piston rod 9''' is guided by a guide component 10'''. The damping cylinder 8''' forms the equalization chamber 14''' together with the casing tube 20'''. The guide component 10''', via a bushing 25''', guides and centers the piston rod 9''', whereby the piston rod gasket 26''' seals the work chamber 12''' and the equalization chamber 14''' from the atmosphere. The bushing 25''' is wetted by damping fluid which is continuously carried along, so that satisfactory lubrication is provided. Excess damping medium carried along accumulates in an annular chamber 27''' and is returned via a connection 28''' to the equalization chamber 14'''. The flow connection 4''', which is also present in the guide component 10''', regulates the flow in connection with the damping valve 1'''.

The damping valve 1''' comprises an electromagnet 2''', which is comprised of a coil body 3''' and a winding 6''', as well as an armature 5'''. If the electromagnet 2''' receives current via the connection lines 21''', then the armature 5''' is immersed in the recess 29''' provided, thereby closing the flow connection 4''' between the upper work chamber and the equalization chamber 14'''. In this embodiment, the damping valve 1''' is a component of the guide component 10'''. To achieve a variable flow of the damping fluid, there are several electromagnets 2''' distributed around the circumference of the guide component 10'''. The armatures 5''' are thereby oriented transverse to the flow connection 4''', so that the flow of the damping medium can take place in both directions.

Figure 28:
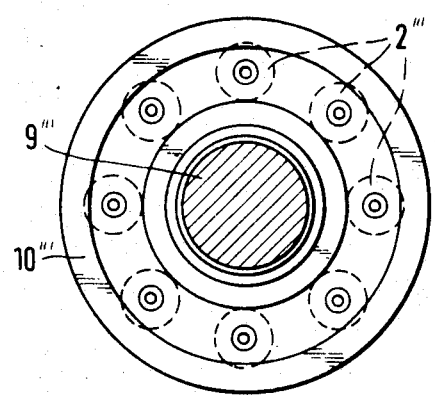
FIG. 28 shows a section through the damping valve illustrated in FIG. 27.

FIG. 28 shows a section through a guide component 10''', in which several electromagnets 2''' are distributed over the circumference. Each electromagnet 2''' has an armature 5''', which can be immersed in a flow connection 4'''. As a result of this arrangement, with a total of eight electromagnets in all, there is a great variability of the regulation of the control of the damping medium located in the damping cylinder 8'''.

Figure 29:
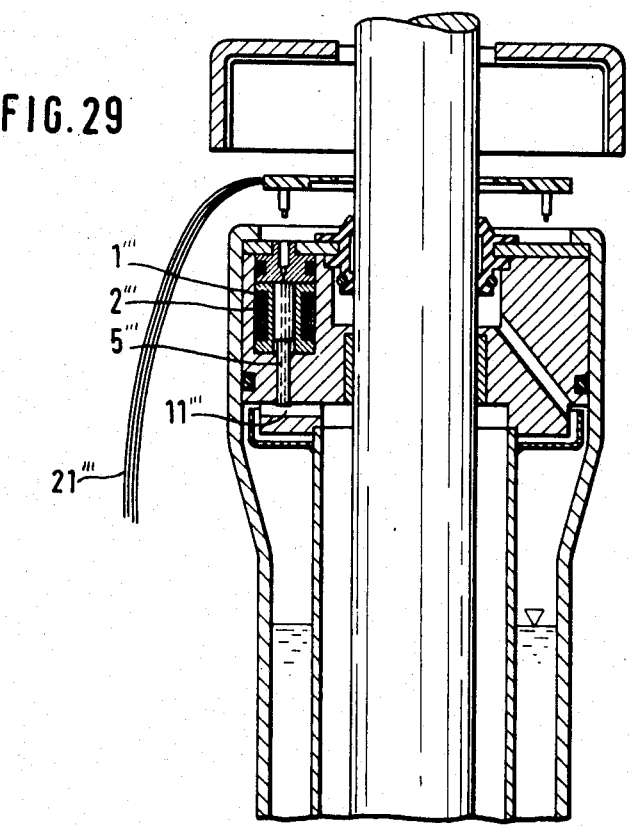
FIG. 29 shows another variant of the damping valve illustrated in FIG. 27, in section.
Figure 30:
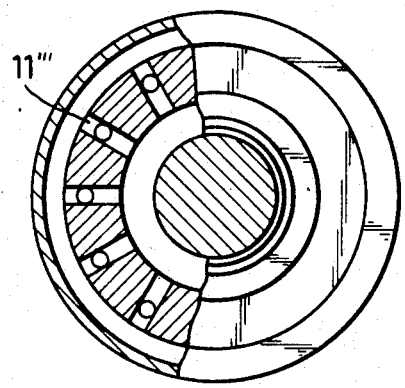
FIG. 30 shows a section through the damping valve illustrated in FIG. 29.

FIG. 29 shows another variant of a damping valve 1''', in which the flow connection 4''' is designed as a channel 11'''. There are several channels 11''' running radially over the entire circumference. Immersed in each channel 11''' is an armature 5''' of an electromagnet 2''', so that, as shown in an overhead view in FIG. 30, a corresponding number of electromagnets 2''' with a desired number of armatures 5''' can completely, or only partially, open or close the flow in the channels 11'''. If armatures 5''' with different diameters and a corresponding electronic system are used, the result is not only a great variability, but also a rapid switching frequency.

Figure 31:
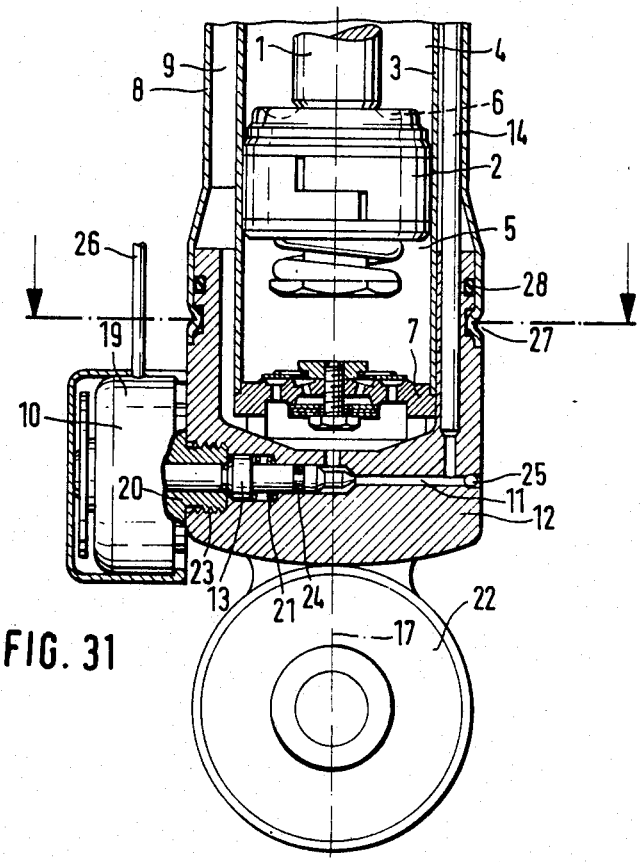
FIG. 31 shows the lower region of a vibration damper in cross section.

The hydraulic vibration damper illustrated in FIG. 31 shows essentially a work cylinder 3* and a piston rod 1* on the end of which a damping piston 2* is fastened. The damping piston 2* divides the inner chamber of the work cylinder 3* into an upper work chamber 4* and a lower work chamber 5*. The damping piston 2* has throttle mechanisms 6*, which serve to damp vibrations. To fasten the vibration damper in the vehicle, there are upper and lower fastening mechanisms 22* (only the lower fastening mechanism 22* being shown in FIGS. 31 and 32). The volume of fluid displaced by the piston rod 1* projecting into the work cylinder 3* is led by way of the bottom valve 7* into an equalization chamber 9*. The equalization chamber 9* is formed by the work cylinder 3* and a jacket tube 8*.

A tubular connection 14* runs in the equalization chamber 9* to a duct 11*, whereby this duct 11* is pressurized by a bypass valve 10* and, depending on the position of the armature 20* and therefore of the distributing regulator 13*, opens or closes a bypass from the upper work chamber 4* by means of the tube 14* and the duct 11* to the equalization chamber 9*.

The bypass valve 10* comprises the electromagnet 19* with an integrate coil and a magnet armature 20*, whereby both are located by means of a bolted connection 23* in the bottom 12* of the shock absorber. The bypass valve 10* is thereby oriented approximately at right angles to the center line 17* of the shock absorber. The distributing regulator 13* is acted upon by the return spring 21*, which constantly produces a force in the direction of the open position of the duct 11*. By means of an O-ring 24* and a frictionset ball 25*, the duct 11* is sealed off from the outer atmosphere therearound. A connection wire 26* is used for the electrical feed of the electromagnet 19*.

When an appropriate bottom 12* is used, the jacket tube is fastened to a stop by a form-tight connection 27*, which is sealed off by a gasket 28*.

Figure 32:
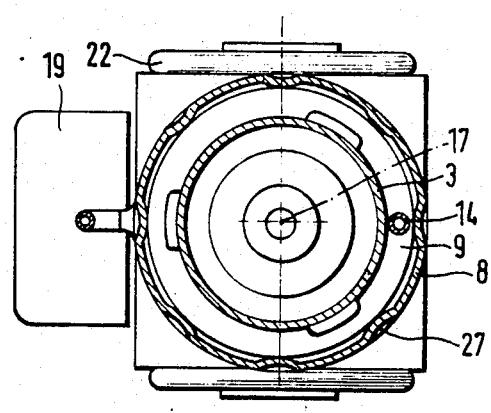
FIG. 32 shows a section of the vibration damper illustrated in FIG. 31.

FIG. 32 shows a cross section in the vicinity of the bottom 12* of the vibration damper illustrated in FIG. 31, whereby the fastening arrangement, as designated by the number 22*, and the work cylinder 3*, together with the jacket tube 8*, form the equalization chamber 9*. A tubular connection 14* which comprises a feed line to the duct 11* is connected to the equalization chamber 9*. The electromagnet 19* is oriented approximately at right angles to the center line 17* of the shock absorber. The form-tight connections 27* comprise partly frictionset regions distributed over the circumference.

Figure 33:
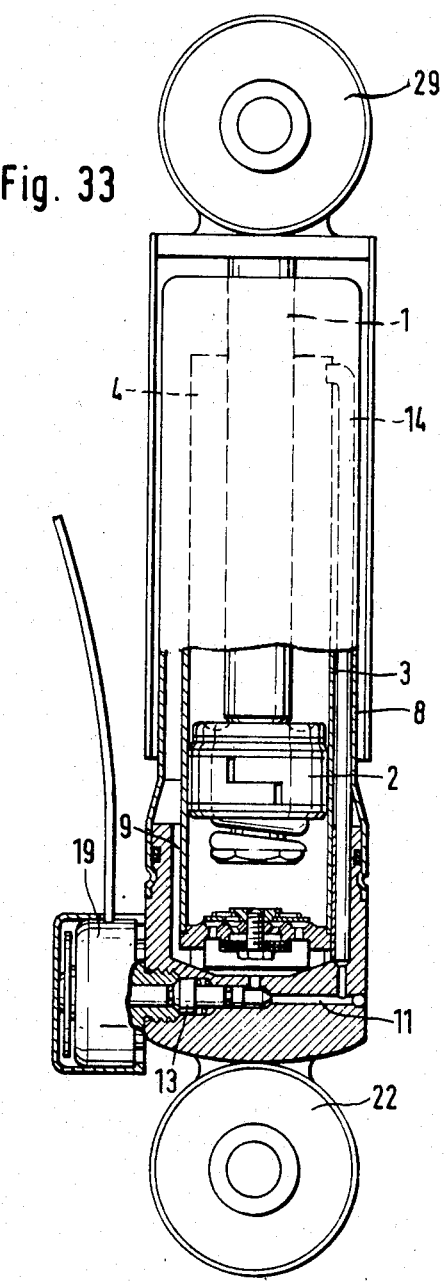
FIG. 33 shows a standard shock absorber in section, which does not exhibit any wheel guiding properties.

FIG. 33 shows a standard shock absorber in principle like that illustrated in FIG. 31, but which in practical operation has to exhibit no wheel-guiding tendencies. It comprises the piston rod 1*, the damping piston 2*, the work cylinder 3* and the jacket tube 8*, as well as the lower fastening 22* and the upper fastening 29*. From the upper work chamber 4*, the tubular connection 14* leads into the duct 11*, past the distributing regulator 13* and into the equalization chamber 9*. The electromagnet 19* controls this bypass connection.

Figure 34:
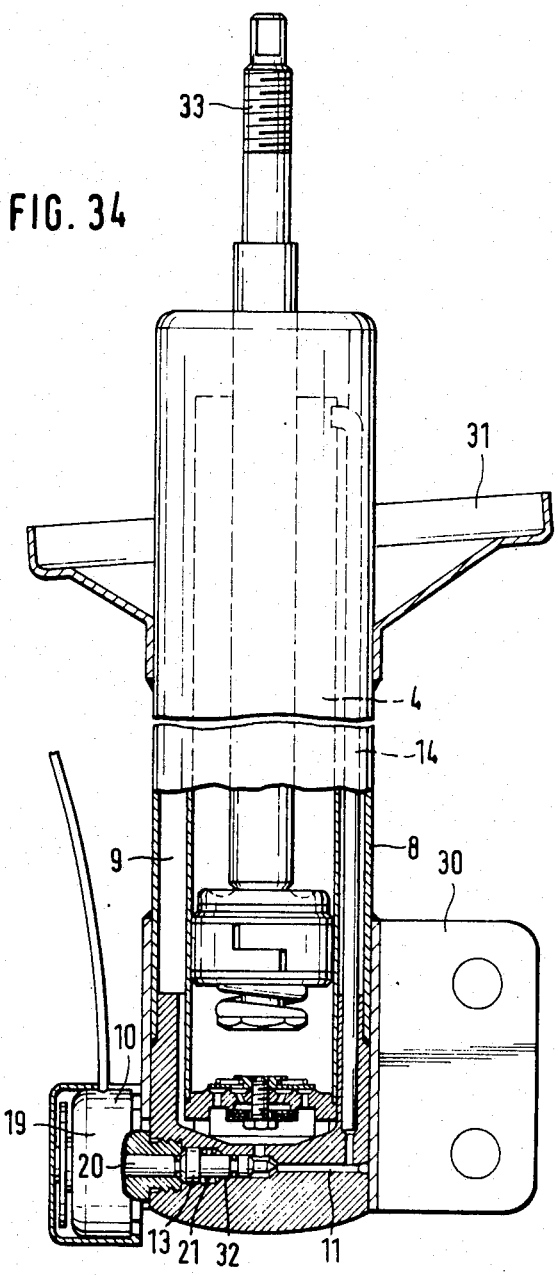
FIG. 34 shows a shock absorber which is in principle like that already illustrated in FIG. 33, but which is configured as a wheel-guiding strut.

FIG. 34 shows a wheel-guiding strut, on which, in contrast to the shock absorber illustrated in FIG. 33, there is also a bracket 30*, which is used to fasten one leg of the axle. The jacket tube 8*, in the upper region, is connected with the lower spring plate 31*, whereby this lower spring plate 31* supports a coil spring. Such wheel-guiding struts are generally a component of a McPherson strut suspension. This embodiment clearly shows that a replaceable bypass valve 10* cannot be located in the upper region. In addition, in this embodiment there is a tubular connection 14* from the upper work chamber 4* by means of the duct 11* to the equalization chamber 9*. The control element 13* is designed separate from the armature 20* of the electromagnet 19* and admission is controlled by means of the graduated hole 32* with a return spring 21*. A connecting bolt 33* is provided to fasten the strut to the vehicle body.

Figure 35:
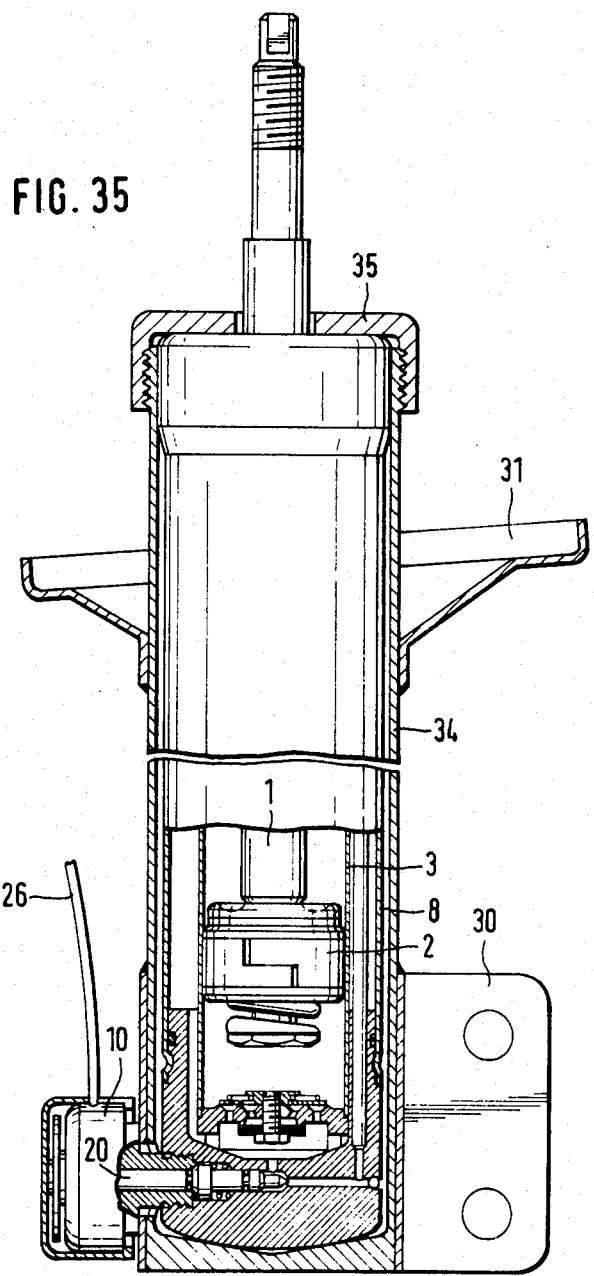
FIG. 35 shows a shock absorber which is in principle the same as that illustrated in FIG. 34, but the shock absorber itself is configured as a strut cartridge for subsequent replacement.

FIG. 35 again shows a wheel-guiding strut, on which the one outside tube 34* is equipped with a screw cap 35*, so that the inside can hold a retrofit cartridge. This retrofit cartridge is a complete shock absorber comprising the piston rod 1*, the damping piston 2*, the work cylinder 3* and the jacket tube 8*. These parts, together with the jacket tube, can be replaced if wear occurs, so that.the outside tube 34*, the bottom spring plate 31* and the bracket 30*, and the vehicle axle leg fastened to it can remain. This replacement is done by unscrewing the bypass valve 10*, so that then there is axial accessibility to the retrofit cartridge. In addition, the principle is comparable to the one illustrated in FIG. 34. Therefore, if the shock absorber is defective, the electromagnet with the coil, armature 20* and the connecting line 26* can remain in the vehicle.

Figure 36:
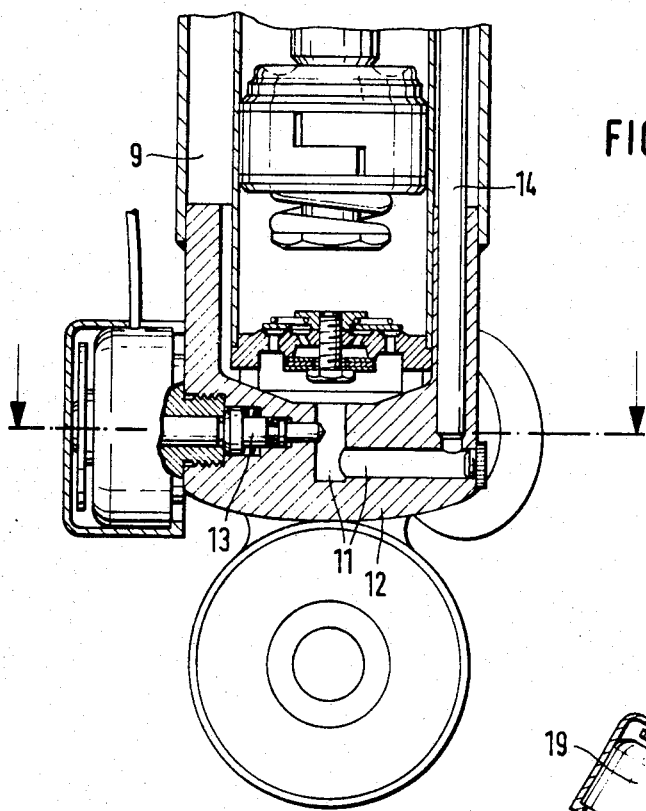
FIG. 36 shows an embodiment which is in principle like that illustrated in FIG. 31, but with several bypass valves.
Figure 37:
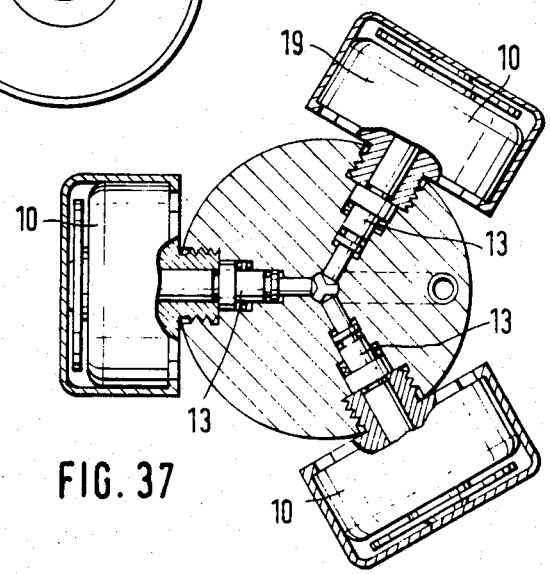
FIG. 37 shows the embodiment illustrated in FIG. 36 in cross section.

The embodiment of a bypass regulation illustrated in FIGS. 36 and 37 relates to an embodiment with a large volume diffusion and variable control by means of three bypass valves 10*. These bypass valves 10* are arranged at an angle of 120° in the bottom 12* of the shock absorber, and control the volume of fluid which flows through the tubular connection and the duct 11* into the equalization chamber 9*. The obtuse angles of the individual distributing regulators 13* are always 120°, so that when all three electromagnets 19* are turned on, the bypass is closed and, depending on the parallel control of each one or two electromagnets 19*, the duct 11* is only partly opened. By a parallel control of each individual bypass valve 10*, a fast reaction time and great flexibility of the entire system can be obtained.

Figure 38:
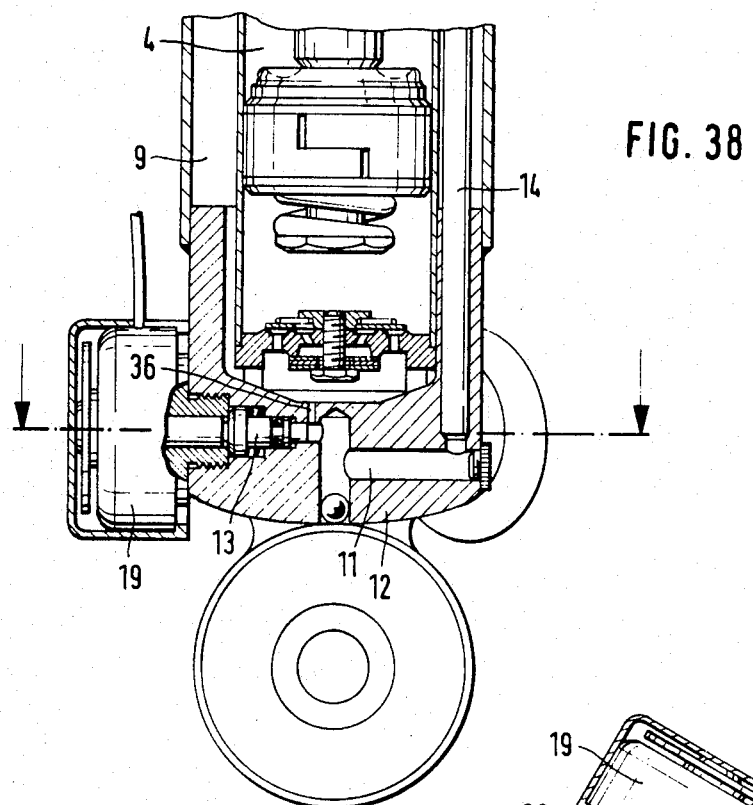
FIGS. 38 and 39 show an embodiment which is in principle like that illustrated in FIG. 36, but the ducts emptying into the equalization chamber have different diameters.
Figure 39:
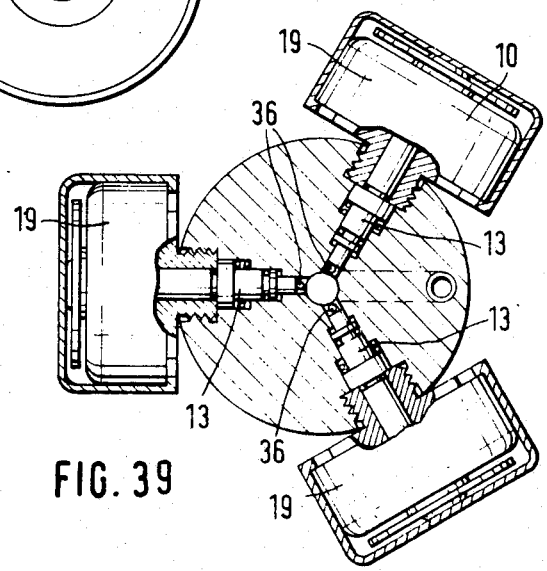

On the duct 11* illustrated in FIGS. 38 and 39, the volume equalization from the upper work chamber 4* to the equalization chamber 9* in the vicinity of the mouth is regulated by individual ducts 36*, admission to each of which is controlled by an electromagnet 19*. These individual ducts 36* can have the same diameter or, as illustrated in FIG. 39, different diameters, so that when different commands are issued to the electromagnets 19*, a number of flow cross sections can be obtained. The corresponding flow cross section to be opened can be adjusted and regulated by means of an appropriate electronic system in the vehicle. Such an electronic system, however, is not necessarily a prerequisite for the operation of the shock absorber itself.

Figure 40:
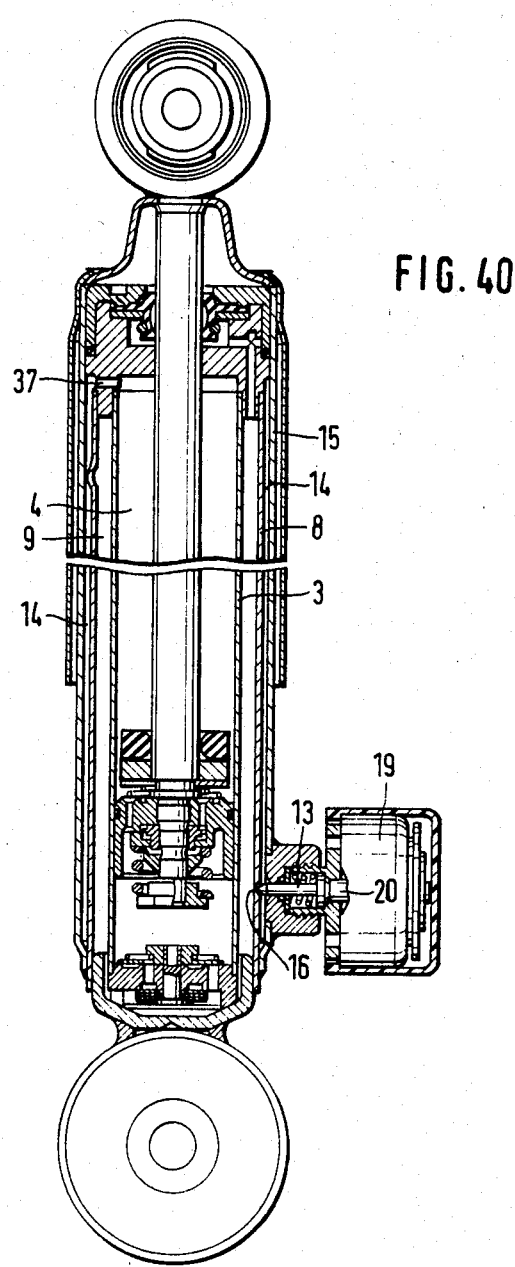
FIG. 40 shows another embodiment of the shock absorber illustrated in FIG. 31 with the difference that there is a coaxially-oriented bypass duct configured as a circular duct.

FIG. 40 shows, as another alternative embodiment, a two-tube shock absorber with an additional tube 15* which, together with the jacket tube 8*, forms the tubular connection 14*. This structure forms a large-volume bypass located coaxially with and around the work cylinder 3*. The damping medium thereby flows from the upper work chamber 4* by means of the transverse hole 37* into the circular connection 14*, and from there by means of the hole 16* through the jacket tube 8* into the equalization chamber 9*.

The duct 11* in FIGS. 31 to 39 is therefore to be considered identical to the hole 16*. This embodiment, too, has a distributing regulator 13*, which is not connected with the armature 20* of the electromagnet 19*.

Figures 41, 42:
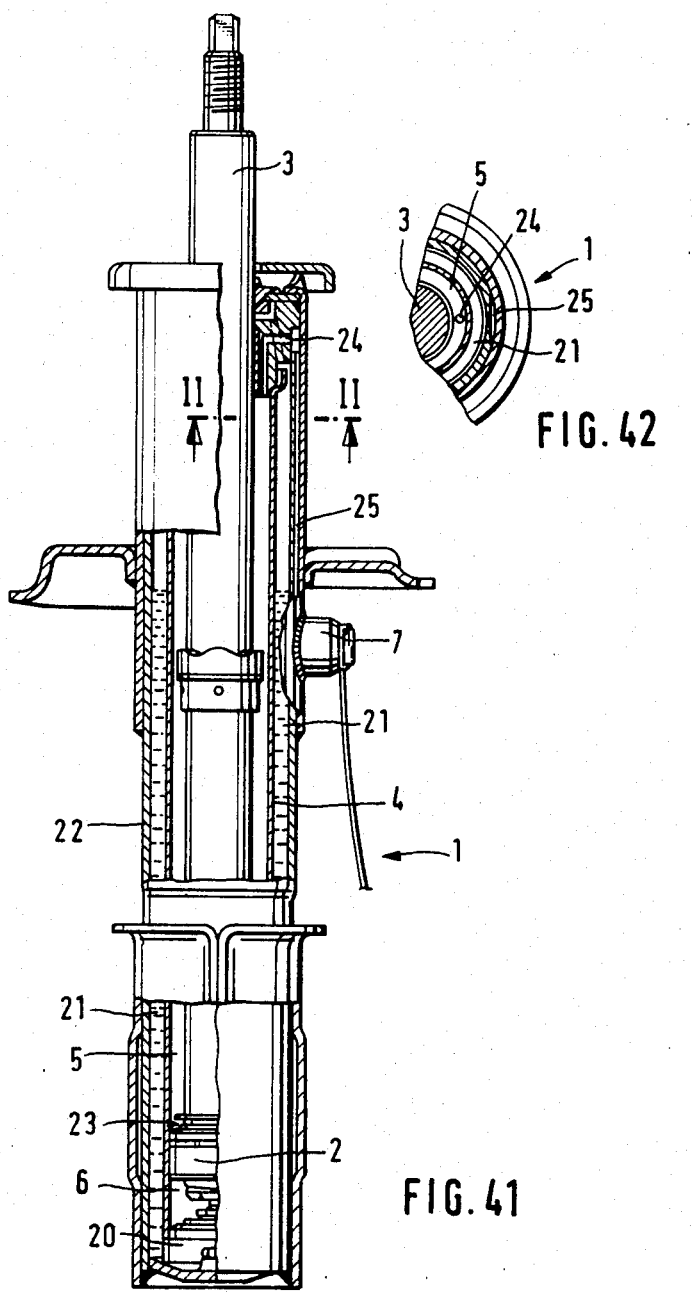
FIG. 41 shows a vibration damping element for vehicles, in section, with valves in the piston and bottom and with a singleacting damping valve with a bypass running from the upper work chamber into the equalization chamber.
FIG. 42 shows a cross section through the damping element illustrated in FIG. 41.

In the vibration damping system illustrated in FIG. 41, there is a shock absorbing leg in a two-tube model. It essentially comprises a damping piston 2, a piston rod 3 and a work cylinder 4. The damping piston 2 divides the work cylinder 4 into an upper work chamber 5 and a lower work chamber 6. The damping piston 2 is also equipped with damping valves. In the bottom 20 of the work cylinder 4, there are other valves, by means of whose cross sections the volume displaced by the piston rod 3 into the equalization chamber 21 is displaced. The equalization chamber 21 is formed by the wall of the work cylinder 4 and the inside wall of the casing tube 22**.

There is a flow connection into the equalization chamber 21 from the upper work chamber 5 via a channel 24, through a bypass 25 into a damping valve 7. In this flow connection, the damping valve 7 controls a variable circulation of fluid.

FIG. 42 shows a cross section of the damping element 1, whereby the Piston rod 3, located in the center, and the upper work chamber 5 is connected via the channel 24 and the bypass channel 25 with the equalization chamber 21. The bypass channel 25** is thereby formed by a locally-flattened tube.

Figure 43:
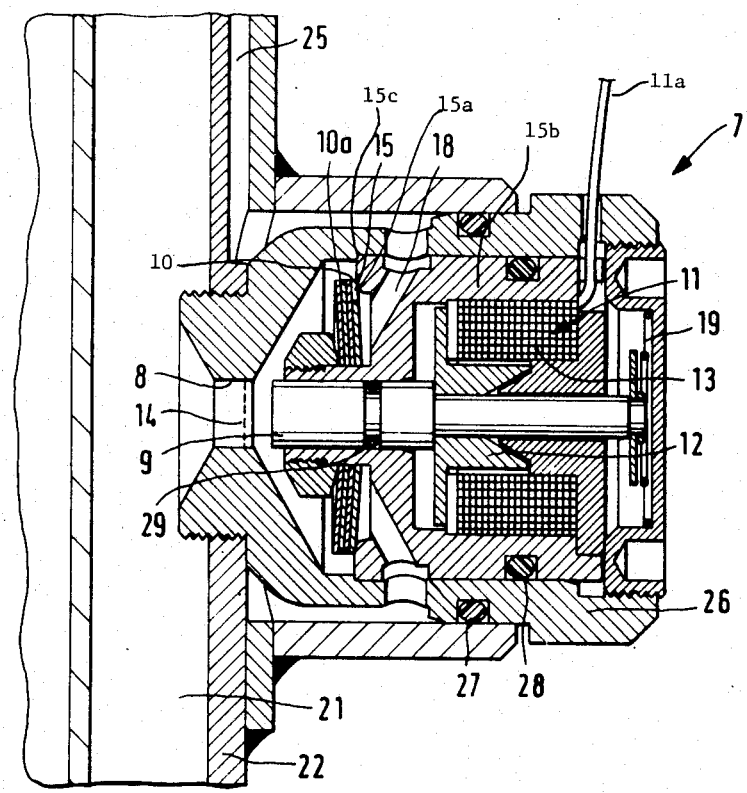
FIG. 43 shows a single-acting damping valve, in section, as an isolated part.

FIG. 43 shows the damping valve 7 in detail, whereby, starting from the bypass channel 25, the damping fluid flows, via inflow holes 18 at a spring-loaded valve 10, through a cross section 14 into the equalization chamber 21. The spring-loaded valve 10 is designed as a spring washer valve and has a constant throttle cross section 15, which allows a flow through the spring-loaded valve 10 in the low piston velocity range. At very low pressures in the inflow holes 18, the spring 10a presses against its valve seat 15a and prevents a flow of fluid thereby. As the pressure in the inflow holes 18 increases, the spring 10a flexes and allows the passage of fluid thereby. The cross section 14 forms, with its opening 8 and the valve body 9, a closable valve, in which the electromagnet 11 comprising a coil 13 and armature 12, makes possible an axial displacement of the valve body 9. A spring 19, disposed at the right hand portion of the Figure, exerts a constant force on the valve body so that the valve is closed when there is no current, with the valve body 9 being positioned within its opening 8. The valve housing 26 is screwed into the casing tube 22, and the electromagnet is sealed by means of gaskets 27, 28 and 29. Since the opening 8, which forms a valve seat, is located in the direction of flow downstream of the spring-loaded valve 10, it only requires an electromagnet with a low power requirement, since the valve body 9 is free of damping pressure feedback. Therefore, the friction and the force of the return spring 19 need only be overcome when the electromagnet 11 is turned on. As a result of the screwing of the sealed unit of the valve housing 26 into the casing tube 22, the system can be easily replaced. In this system, the flow travels past the valve in the decompression and compression stage from one direction, namely the bypass 25, to the inflow holes 18 toward the spring-loaded valve 10. During a build-up of pressure in the inflow holes 18, the spring 10a releases the pressure back up which can then cause a flow of fluid through the opening 8 when the valve body 9 is retracted. When the body 9 is positioned within the opening 8, the flow of fluid therethrough is substantially stopped. A wire 11a connected to the coil 13** is preferably connected to a control system, such as shown in FIGS. 19 and 23.

The body 15b around the opening 8 does not move in this embodiment of the invention because it rests against a shoulder 15c**.

Figure 44:
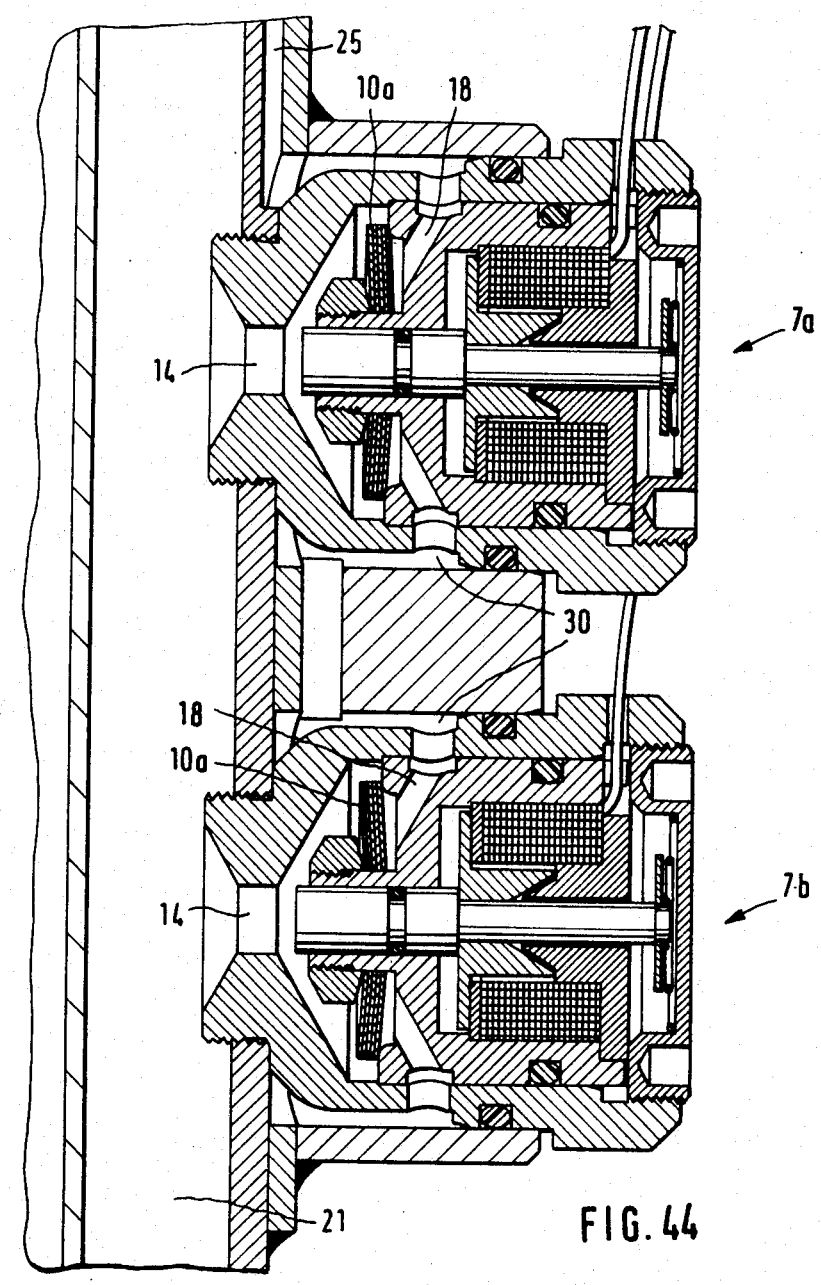
FIG. 44 shows the arrangement of two single-acting damping valves in cross section.

FIG. 44 shows an arrangement of two damping valves 7a and 7b, connected in parallel, whereby the damping fluid is conducted via the bypass 25 and the inflow holes 18 of the two valves 7a and 7b via the annular channel 30. By means of the cross section 14, the damping fluid is discharged into the equalization chamber 21. As a result of the arrangement of the two parallel damping valves 7a and 7b, an additional flexibility is possible if there is a different configuration of the spring-loaded valve 10. At the same time, these damping valves 7a and 7b can also be connected so that there are different damping characteristics which can be achieved for the decompression stage and the compression stage. A corresponding electronic system can control the corresponding connection capabilities in such an embodiment.

Figure 45:
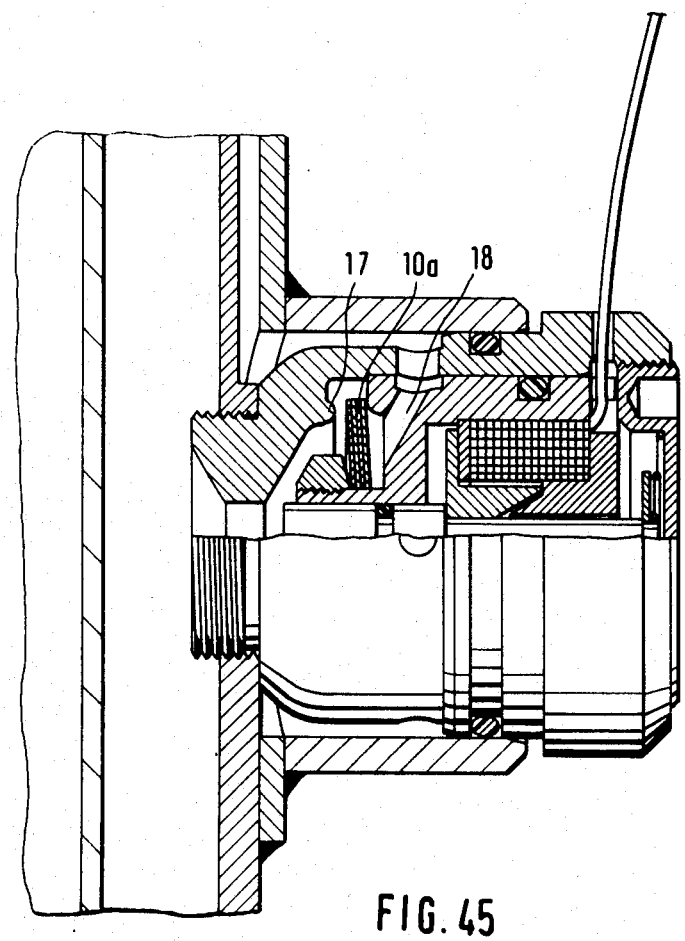
FIG. 45 shows a semi-section of a single-acting damping valve with a blockable spring washer valve.

FIG. 45 shows an embodiment, in which the spring-loaded valve 10a can execute an axial stroke when there is a corresponding damping pressure from the inflow holes 18. If the corresponding specified pressure is exceeded, the spring-loaded valve 10a contacts the second valve seat 17, thereby blocking the flow connection.

Figure 46:
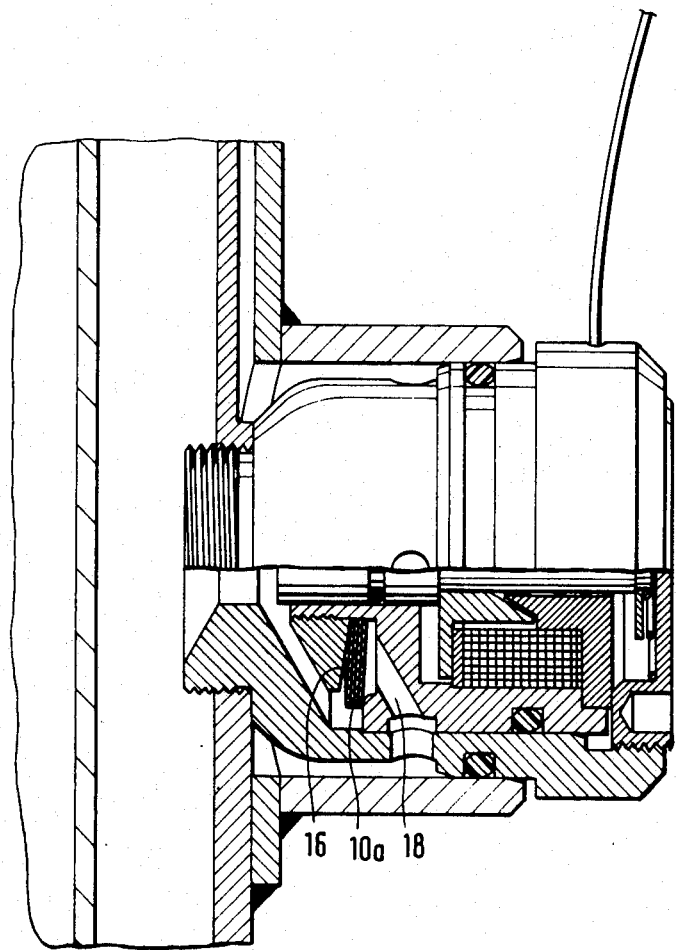
FIG. 46 shows a semi-section of a single-acting damping valve with a spring washer valve with stroke limitation.

FIG. 46, on the other hand, shows a spring-loaded valve 10a, which is equipped with a stroke limitation by means of a stop 16, whereby a correspondingly larger opening cross section of the spring-loaded valve 10a is released only at a predetermined specified pressure. If the pressure continues to increase via the inflow holes 18, the opening cross section can then be kept constant; that is, no larger opening cross section is released by the stop 16**.

Figure 47:
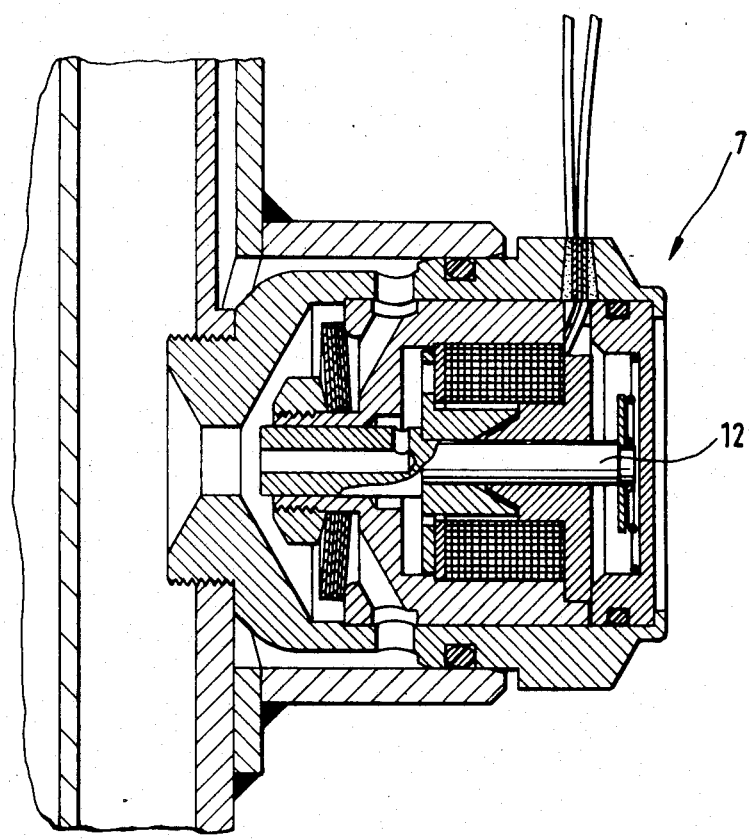
FIG. 47 shows a section, through a single-acting damping valve, in which the electromagnet is flowed over by the damping medium.

FIG. 47 shows a damping valve 7, in which the chamber of the armature 12 is not sealed off and is therefore flooded by the damping medium. The advantage of this variant resides in that the seal of the armature 12 can be eliminated, and the elimination of its friction reduces the power requirement of the magnet 11. This reduction results from the fact that the armature 12 need no longer work against the pressure of the damping medium. In addition, the cooling and the noise level of the valve 7 are improved.

Figures 48, 49:
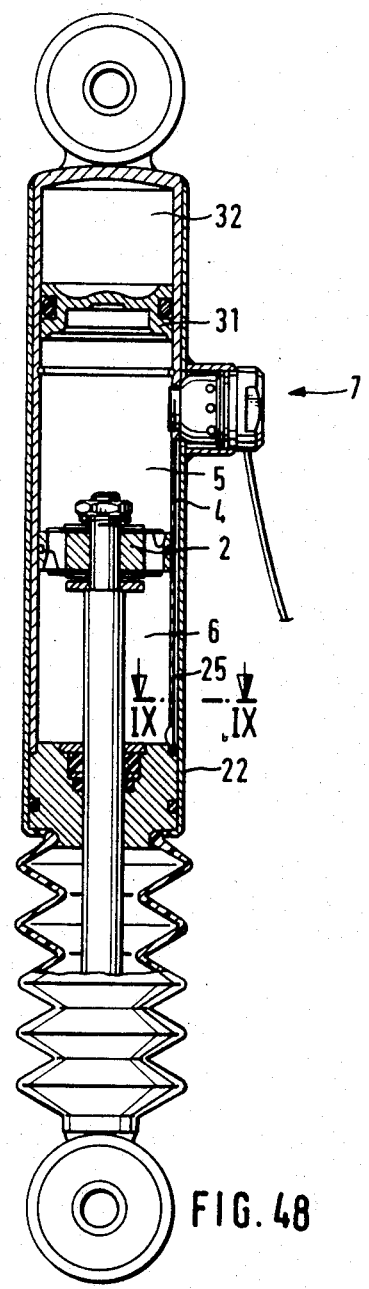
FIG. 48 shows a vibration damping element for vehicles, in section, with valves in the piston and with a double-acting damping valve and a bypass running from the upper work chamber into the lower work chamber.
FIG. 49 shows a cross section through the damping element illustrated in FIG. 48.

FIG. 48 shows a vibration damping element for vehicles, in which the upper work chamber 5 is connected with the lower work chamber 6 by means of a bypass 25. This is a one-tube model, whereby a separating piston 31 provides an additional division in the upper work chamber 5, which separates the gas chamber 32 from the upper work chamber 5. The damping valve 7 is connected so that it projects directly into the upper work chamber 5. An appropriate configuration of the stroke of the piston 2 assures that this piston 2 in the work cylinder 4 executes only those axial movements which do not extend into the range of the damping valve 7**.

The flow travels past the damping valve 7, illustrated in FIG. 48 in the decompression and compression phase, from different directions. In the decompression stage, the damping medium moves from the lower work chamber 6, through the bypass 25 on the damping valve 7, and into the upper work chamber 5**. In the compression stage, this flow connection is acted upon in the opposite direction.

FIG. 49 shows a segment of the work cylinder 4 of the casing tube 22, whereby the bypass 25 is formed by a local flattening of the work cylinder 4.

FIG. 50 again shows an embodiment of a one-tube gas shock absorber, in which the work cylinder 4 is divided by the piston 2 into the upper work chamber 5 and the lower work chamber 6. The gas chamber 32 is separated from the upper work chamber 5 by the separating piston 31. Any undesired axial movement of the separating piston 31 is prevented by means of the retaining ring 33**.

To assure the axial utilization of the stroke, the damping valve 7 is located in the casing tube 22 so that there is a continuously open connection via the hole 34 into an annulus 35. This annulus 35 is therefore a component of the upper work chamber 5. In the compression stage, the flow travels from the upper work chamber 5 through the annulus 35 to the damping valve 7, and from there into the lower work chamber 6, via the bypass 25 through the hole 36. In the decompression stage, this flow connection carries the flow in the opposite direction. That means that flow also travels past the damping valve 7** in the decompression and compression stage from different directions in this embodiment.

Figures 50, 51:
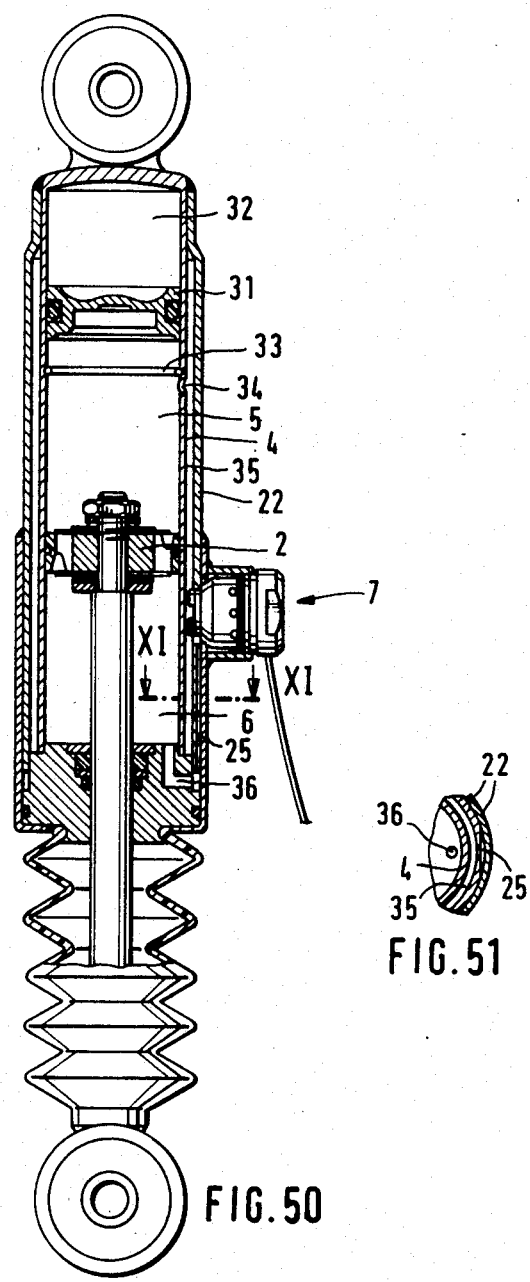
FIG. 50 shows a vibration damping element for vehicles, in cross section, essentially like that illustrated in FIG. 48, but with a bypass running from the upper work chamber via an annulus into the lower work chamber.
FIG. 51 shows a cross section through the damping element illustrated in FIG. 50.

FIG. 51 shows a segment through the work cylinder 4, the annulus 25, whereby the double-walled casing tube 22 again has a locally flattened recess on the inner tube, and thus forms the bypass 25, which is in communication with the lower work chamber 6 via the hole 36.

Figure 52:
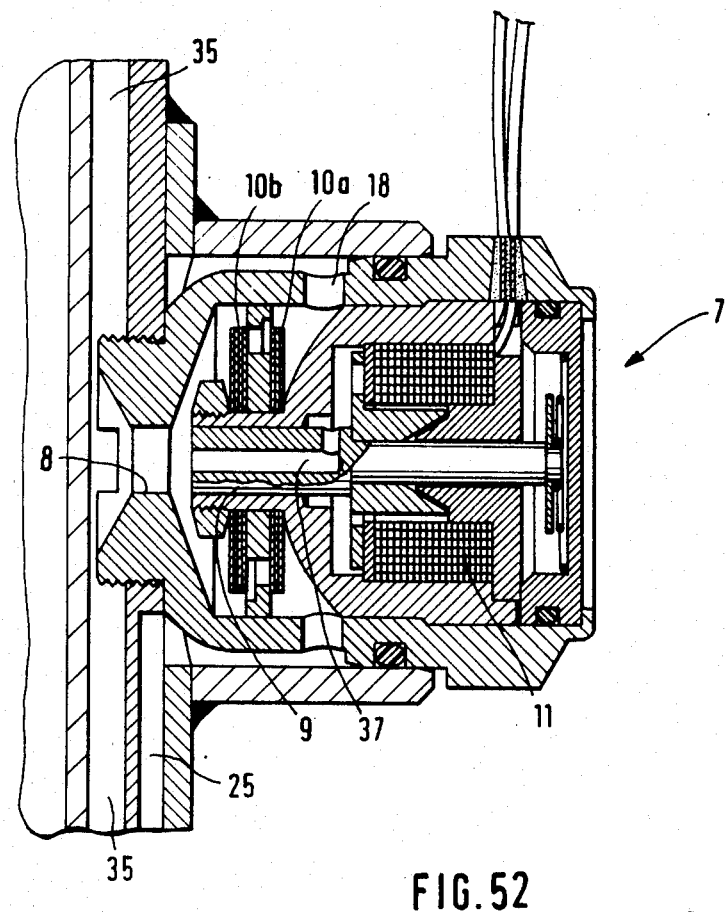
FIG. 52 shows a double-acting damping valve, in cross section in detail, in which the electromagnet is flowed over by the damping medium.

FIG. 52 shows a double-acting damping valve for embodiments such as those shown in FIGS. 48 and 49, in which the flow travels past the damping valve 7 from different directions in the decompression and compression stage. FIG. 52 repeats the embodiment shown in FIG. 50, with regard to the arrangement of the bypass ducts 25 and the annulus 35. The damping valve 7 is specifically the opening 8, which can be closed by the valve body 9. The spring-loaded valve 10 is the two spring washers 10a and 10b, whereby each is active in a different direction of flow. By means of the central hole 37 of the valve body 9, the damping medium flows over the electromagnet 11. In the compression stage, when the valve body 9 is open, the flow of the damping valve 7 takes place via the annulus 35, the opening 8, past the spring-loaded valve 10, through the inflow holes 18 into the bypass 25, and from there into the lower work chamber 6.

In the decompression stage, on the other hand, the flow of the damping medium takes place from the bypass 25 via the inflow holes 18 to the spring-loaded valve 10b, the opening 8 into the annulus 35, and thus into the upper work chamber 5.

Figure 53:
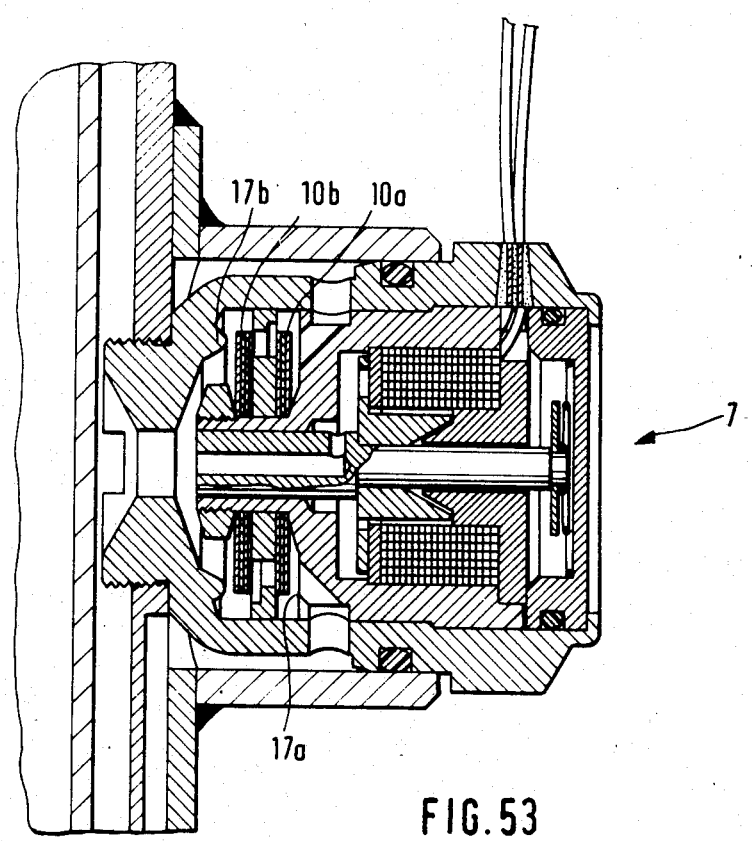
FIG. 53 shows a double-acting damping valve with blockable spring washer valves.
Figure 54:
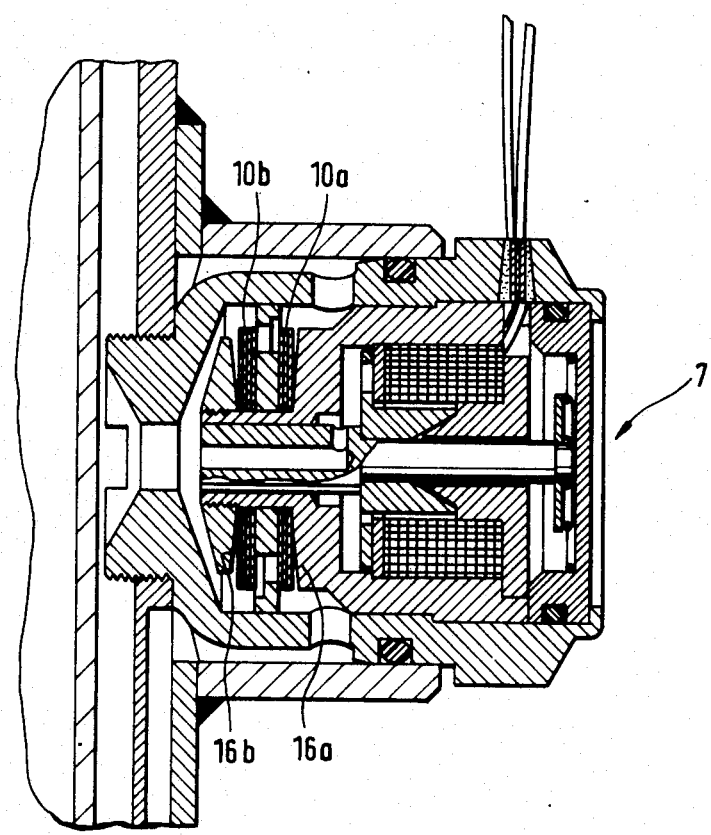
FIG. 54 shows a double-acting damping valve, in cross section, with spring washer valves and a stroke limitation.

The damping valves 7 illustrated in FIGS. 53 and 54, are variants of the damping valve 7 illustrated in FIG. 52. In FIG. 53, the spring-loaded valves 10a and 10b are each provided with a second valve seat 17a and 17b. The two valve seats 17a and 17b block the damping valve 7, when a specified pressure is exceded, by means of the spring-loaded valves 10a and 10b. In the compression stage, when an overpressure occurs, the spring-loaded valve 10a on the second valve seat 17a is activated. In the decompression stage, the spring-loaded valve 10b acts on the second valve seat 17b and thereby blocks off any further flow through the damping valve 7. Depending on the configuration of the spring-loaded valves 10a and 10b, a corresponding overpressure can be adjusted.

FIG. 54 shows each of the spring-loaded valves 10a and 10b equipped with a stop 16a and 16b. The stroke of the spring-loaded valves 10a and 10b is limited by these stops, so that when a specified pressure is exceeded, the flow cross section is not enlarged any further. In the compression stage, the spring-loaded valve 10a is articulated so that when the specified pressure is exceeded, contact is made with the stop 16a. In the decompression stage, in the reverse flow direction, the spring-loaded valve 10b is articulated until it comes into contact with the stop 16b.

Figures 55, 55A, 56:
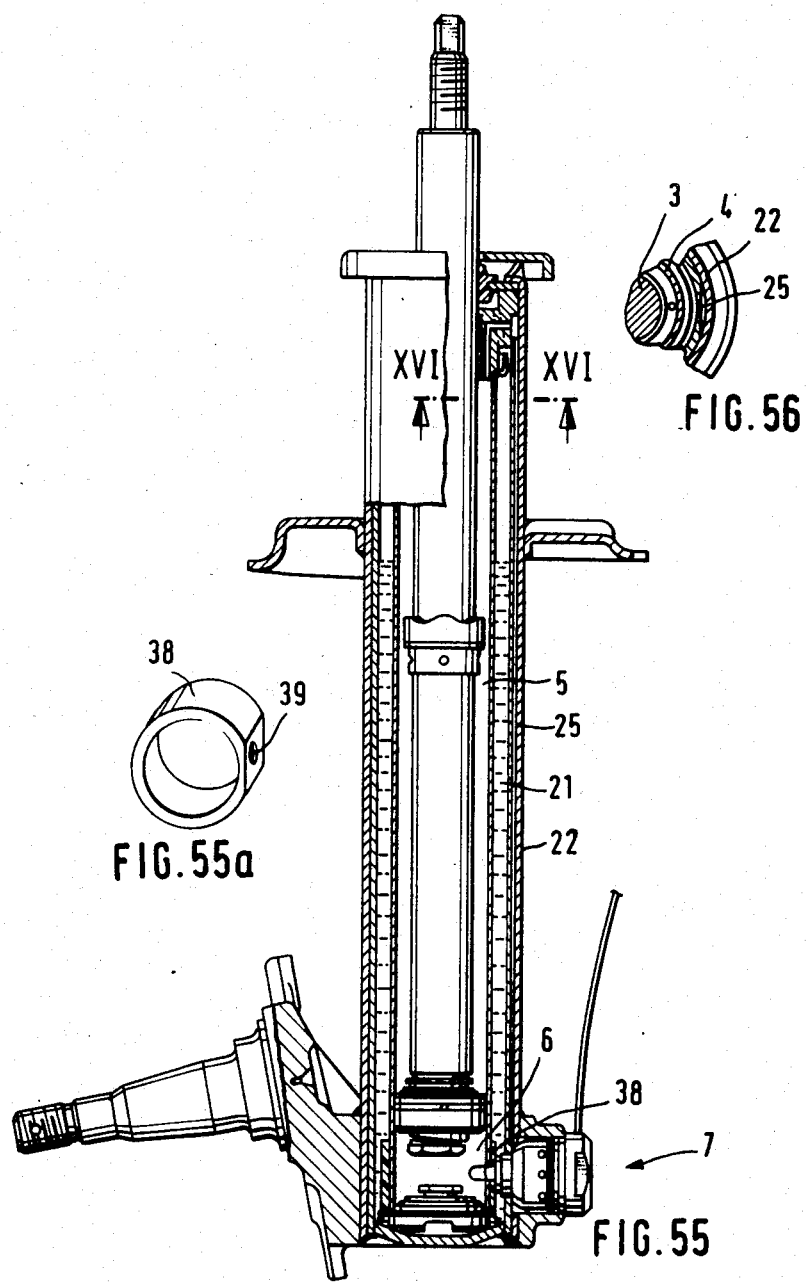
FIG. 55 shows a vibration damping element for vehicles, in cross section, with valves in the work piston and bottom and with a double-acting damping valve and a bypass running from the upper work chamber into the lower work chamber or equalization chamber.
FIG. 55a shows an intermediate ring with a recess.
FIG. 56 shows a cross section through the damping element illustrated in FIG. 55.
Figure 57:
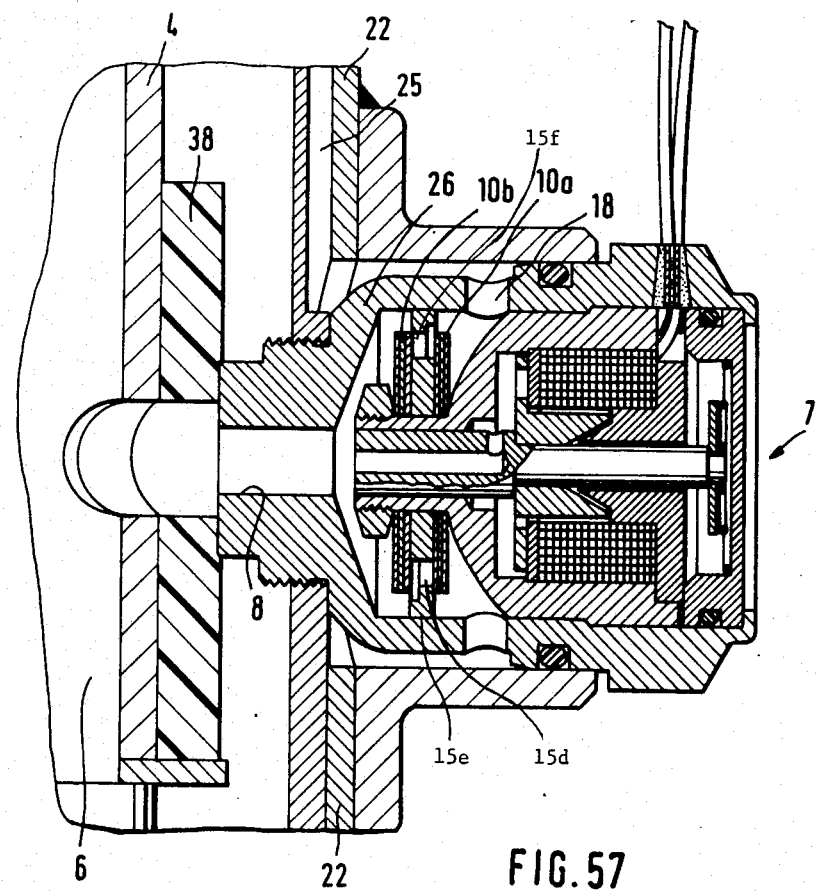
FIG. 57 shows a double-acting damping valve, in cross section in detail, for an application of the bypass from the upper work chamber into the lower work chamber.
Figure 58:
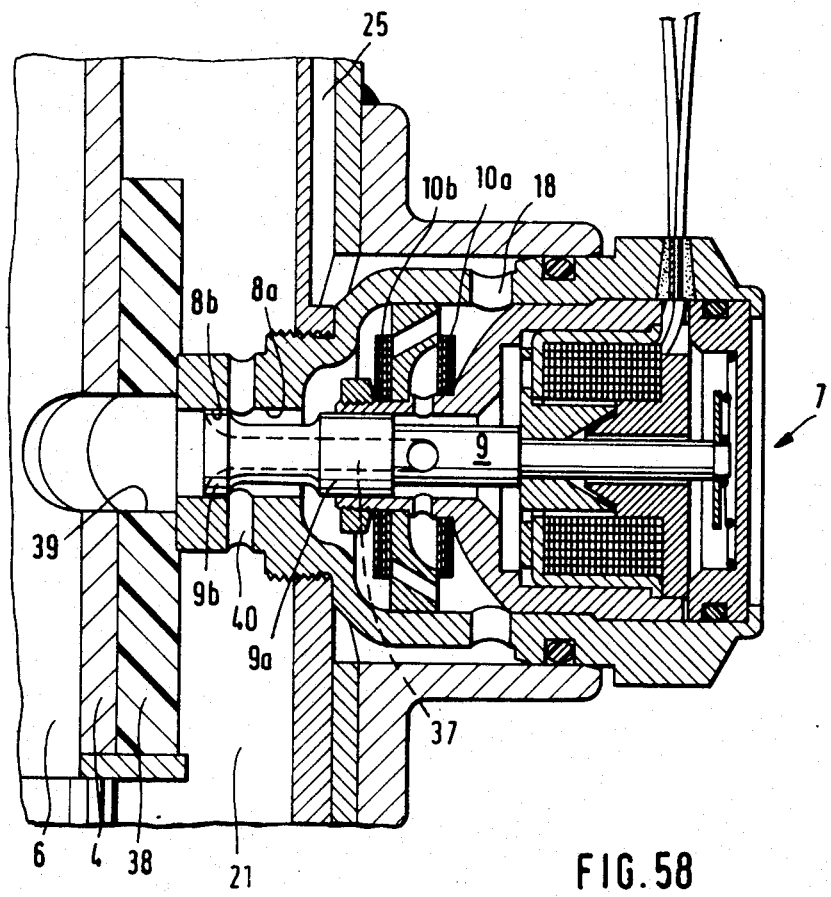
FIG. 58 shows a triple-acting damping valve, essentially like the one illustrated in FIG. 57, with the distinction that there is a possibility for a connection from the upper work chamber to the lower work chamber and to the equalization chamber.

FIGS. 55 and 56 show a two-tube vibration damper, on which the bypass 25 either connects the upper work chamber 5 with the lower work chamber 6 (as shown in FIG. 57), or connects the upper work chamber 5 with the equalization chamber 21 and the lower work chamber 6 (as shown in FIG. 58). Therefore, the damping valve 7 is connected to the casing tube 22, and there is a connection to the lower work chamber 6 via the intermediate ring 38.

FIG. 55a shows the intermediate ring 38 with the recess 39 in detail.

FIG. 56 shows the section through the work cylinder 4, the piston rod 3 and the casing tube 22. The bypass 25 is again formed by a local flattening.

FIG. 57 shows the damping valve 7 illustrated in FIG. 55, whereby the work cylinder 4 is surrounded by the intermediate ring 38 and the valve housing 26 is screwed to the casing tube 22. The casing tube 22 comprises an inner and outer tube, so that the bypass 25 is formed by the local flattening. In this embodiment, the flow again travels past the damping valve 7 from different directions in the decompression and compression stage. In the compression stage, the damping medium flows out of the lower work chamber 6 via the opening 8 on the spring-loaded valve 10a, through the inflow holes 18 and into the bypass 25. In the reverse direction, in the decompression stage, the flow of the damping medium travels out of the upper work chamber 5 via the bypass 25, past the inflow openings 18 on the spring-loaded valve 10b, through the opening 8, and into the lower work chamber 6. An orifice 15d extends through a plate 15e at the bottom thereof, as shown in the Figure. The plate 15e is disposed between the spring-loaded valves 10a and 10b. As the pressure in the opening 8 increases above a predetermined value with regard to the pressure in the holes 18, the spring-loaded valve 10a opens. A second orifice 15f extends through the upper portion of the plate 15e, and functions analogously to the orifice 15d when the pressure in the holes 18** exceeds a predetermined magnitude.

FIG. 58 shows another variant, which can be used in the embodiment illustrated in FIG. 55 and somewhat similar in operation to the embodiment shown in FIG. 57. The damping valve 7 is thereby equipped with a valve body 9, which has a step-like configuration in the area facing the opening 8. The cylindrical area 9a can thereby close the opening 8a, whereby the lower work chamber 6 is continuously separated from the equalization chamber 21 by the cylindrical area 9b of the valve body 9. Between the areas 8a and 8b of the opening 8, there is at least one recess 40, which connects the bypass with the equalization chamber 21. The valve body 9 also has a central hole 37, which, depending on the position of the valve, is in communication with the equalization chamber 21**.

When the bypass is open, that is, when the cylindrical area 9a releases the flow connection with regard to the opening 8a, the flow of the damping medium travels in the compression stage from the lower work chamber 6 via the recess 39 of the intermediate ring 38, past the central hole 37 on the spring-loaded valve 10a, past both inflow holes 18, into the bypass 25, also past the spring-loaded valve 10b on the opening 8a to the recesses 40, and into the equalization chamber 21. In other words, the damping medium in the compression stage flows through both spring-loaded 10a and 10b, and is thereby divided both into the upper work chamber 5 and into the equalization chamber 21**.

In the decompression stage, on the other hand, the damping medium flows through the bypass 25, over the inflow holes 18 on the spring-loaded valve 10b, through the opening 8a and the recesses 40, and into the equalization chamber 21. In other words, with the same positioning of the valve body 9 in the compression stage, both spring-loaded valves 10a and 10b are activated in succession, while in the decompression stage, only the spring-loaded valve 10b is activated.

The invention as described hereinabove in the context of the preferred embodiments is not to be taken as limited to all of the provided details thereof, since modifications and variations thereof may be made without departing from the spirit and scope of the invention.

What is claimed is:

1. An adjustable hydraulic shock absorber having a cylinder with a piston disposed therein dividing said cylinder into at least two chambers, each for containing damping fluid, said shock absorber including:
    means for throttling said damping fluid when said damping fluid moves from one of said chambers into another;
    said piston having a piston rod connected thereto;
    said piston rod having first means for attachment of said piston rod at one end thereof;
    said cylinder having second means for attachment, at a portion thereon other than said first means for attachment at said piston rod;
    means for bypassing damping fluid;
    means for accepting bypassed damping fluid;
    said bypassing means being disposed to bypass said damping fluid from one of said damping fluid-containing chambers to said accepting means;
    said bypassing means including damping valve means for regulating flow of said damping fluid in said bypassing means;
    said damping valve means having first valving means and second valving means connected in series so that said damping fluid passing through said first valving means also passes through said second valving means;
    said first valving means and said second valving means both having means for operating independently of one another;
    said first valving means having biasing means including at least one spring biasing component for substantially preventing flow of said damping fluid therethrough when a pressure thereacross is in a range less than a predetermined value; and
    said second valving means including an axially-displaceable component for effecting the opening and closing of said second valving means and an orifice for receiving said axially-displaceable component, and means for opening and closing said second valving means, said opening and closing means having means for connection to controlling means being disposed external to said damping valve means, said axially-displaceable component being controlled by means for opening and closing said second valving means, said opening and closing means for controlling opening and closing of said orifice for receiving said axially-displaceable component including electromagnetic means for moving said axially-displaceable component.

2. The adjustable hydraulic shock absorber according to claim 1 wherein said first valving means disposed upstream of said second valving means.

3. The adjustable hydraulic shock absorber according to claim 1 wherein said biasing means of said first valving means has means for biasing said first valving means closed in both directions of pressure differential thereacross when said pressure differential thereacross is in a range less than a predetermined value.

4. The adjustable hydraulic shock absorber according to claim 1 including means for passing said damping fluid through said damping valve means in a single direction, during compression and decompression operations of said shock absorber.

5. The adjustable hydraulic shock absorber according to claim 4 including means for passing said damping fluid through said damping valve means from different directions during compression and decompression operations of said shock absorber.

6. The adjustable hydraulic shock absorber according to claim 5 wherein said means for biasing said first valving means in both directions of pressure differential comprises at least two spring valve components, one of said spring valve components carrying a flow of said damping fluid in one direction through said damping valve means during compression of said shock absorber, and a second of said spring valve components for permitting a flow of said damping fluid through said first damping valve means during decompression of said shock absorber.

7. The adjustable hydraulic shock absorber according to claim 1 wherein said electromagnetic means comprises an electromagnet having a coil and means for directing flow of said damping fluid over said electromagnet, whereby said electromagnet is cooled during operation.

8. The adjustable hydraulic shock absorber according to claim 1 wherein said axially displaceable component is an armature of said electromagnetic means, and wherein said axially displaceable component comprises a plunger for opening and closing said orifice for receiving said axially displacable component.

9. The adjustable hydraulic shock absorber according to claim 8 including second biasing means connected to said axially displacable component for biasing said axially displacable component into engagement with said orifice, said second biasing means for closing said orifice when said valve is quiescent by biasing said axially displacable component within said orifice when said electromagnetic means are de-energized.

10. The adjustable hydraulic shock absorber according to claim 9 wherein said second biasing means acts in only one sense of pressure across said second valving means.

11. The adjustable hydraulic shock absorber according to claim 9 wherein said second biasing means, of said second valving means, comprises at least one coil spring.

12. The adjustable hydraulic shock absorber according to claim 1 wherein said orifice and said axially displacable component comprise throttling means for said second valving means.

13. The adjustable hydraulic shock absorber according to claim 1 wherein said at least one spring biasing component comprises spring washer means; said spring washer means flexing to open said first valving means and flexing to close said first valving means;

said first valving means having valve seat means;
said spring washer means making contact with said valve seat means by flexing when a pressure differential across said first valving means is less than a predetermined magnitude and flexing to open to fluid flow when said pressure differential across said first valving means is greater than said predetermined magnitude.

14. The adjustable hydraulic shock absorber according to claim 1 wherein said biasing means of said first valving means comprises at least one spring washer and at least one coil spring.

15. The adjustable hydraulic shock absorber according to claim 1 wherein said biasing means of said first valving means comprises a washer and at least one coil spring.

16. The adjustable hydraulic shock absorber according to claim 1 wherein said at least one spring biasing component of said first valving means snaps open during opening actuation and provides a constant cross section between said valve seat and said spring biasing component when said damping fluid flows through said first valving means, thereby providing a constant open valving area for passing said damping fluid therethrough.

17. The adjustable hydraulic shock absorber according to claim 1 wherein said first valving means includes a stop means for limiting motion of said first valving means when said first valving means is in an open state, for passing said damping fluid therethrough.

18. The adjustable hydraulic shock absorber according to claim 13 wherein said valve seat means of said first valving means includes a second valve seat means; said second valve seat means being disposed on an opposite side of said spring washer means from said first valve seat means; said second valve seat means, being disposed for limiting movement of said spring washer means when a second predetermined pressure across said first valving means in a first direction is exceeded, such that a stroke of said first valving means is limited.

19. The adjustable hydraulic shock absorber according to claim 1 including first throttling means disposed for throttling a flow of said damping fluid to said first valving means.

20. The adjustable hydraulic shock absorber according to claim 1 including a plurality of said damping valve means connected in parallel, wherein said plurality of damping valve means has at least one valve connected for compression of said shock absorber, and at least one other valve connected for decompression of said shock absorber.

21. The adjustable hydraulic shock absorber according to claim 1 wherein said controlling means comprises electronic control means; sensors for sensing predetermined parameters of said shock absorber; said sensors connected to said electronic control means; said electronic control means connected to and for controlling said second valving means.

* * * * *